United States Patent [19]

Funada et al.

[11] Patent Number: 5,724,440
[45] Date of Patent: Mar. 3, 1998

[54] IMAGE PROCESSING APPARATUS

[75] Inventors: Masahiro Funada; Shinobu Arimoto, both of Yokohama, Japan

[73] Assignee: Canon Kabushiki Kaisha, Tokyo, Japan

[21] Appl. No.: 346,292

[22] Filed: Nov. 23, 1994

Related U.S. Application Data

[62] Division of Ser. No. 301,029, Sep. 6, 1994, Pat. No. 5,420,938, which is a continuation of Ser. No. 945,585, Sep. 16, 1992, abandoned, which is a continuation of Ser. No. 560,899, Jul. 31, 1990, abandoned.

[30] Foreign Application Priority Data

Aug. 2, 1989 [JP] Japan .................... 1-200500

[51] Int. Cl.$^6$ ................................. G06K 9/00
[52] U.S. Cl. .................... 382/162; 382/173; 382/191; 358/518
[58] Field of Search ..................... 382/162, 191, 382/173, 176; 358/501, 515, 518, 529, 538, 401; 355/326 R, 327

[56] References Cited

U.S. PATENT DOCUMENTS

| 4,841,335 | 6/1989 | Kohyama | 355/326 R |
| 4,953,013 | 8/1990 | Tsuji et al. | 358/515 |
| 4,996,591 | 2/1991 | Kadowaki et al. | 358/519 |

Primary Examiner—Leo Boudreau
Assistant Examiner—Phuoc Tran
Attorney, Agent, or Firm—Fitzpatrick, Cella, Harper & Scinto

[57] ABSTRACT

An image processing apparatus includes a judgment circuit for judging whether an input image is a monochrome image or a color image on the basis of an input image signal. In an image type judging mode, a judgment is made by that circuit. A copy of the input image is made based on the result of the judgment.

20 Claims, 35 Drawing Sheets

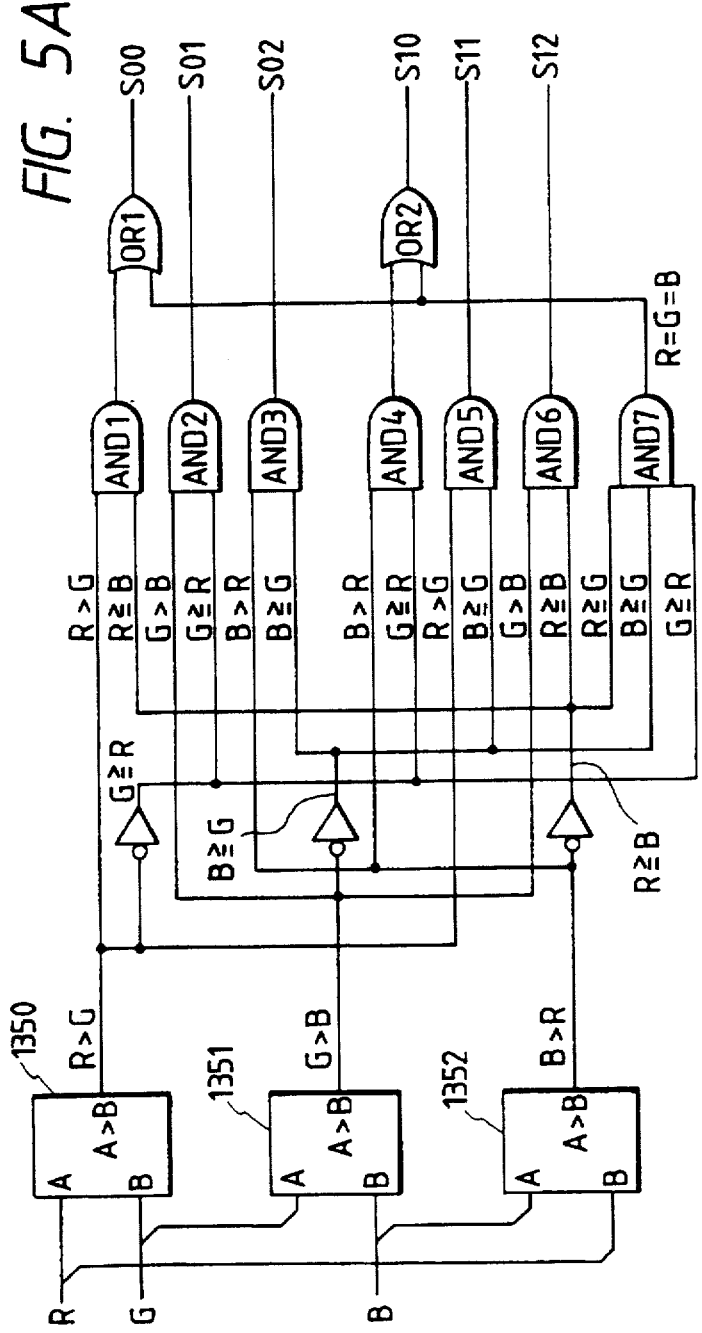

| S0 | S1 | S2 | Y |
|----|----|----|---|
| 1  | 0  | 0  | A |
| 0  | 1  | 0  | B |
| 0  | 0  | 1  | C |

|   | BL1 | UNK1 | COL1 |
|---|-----|------|------|
| A | 1   | 0    | 0    |
| B | 0   | 1    | 0    |
| C | 0   | 0    | 1    |
| D | 0   | 0    | 0    |

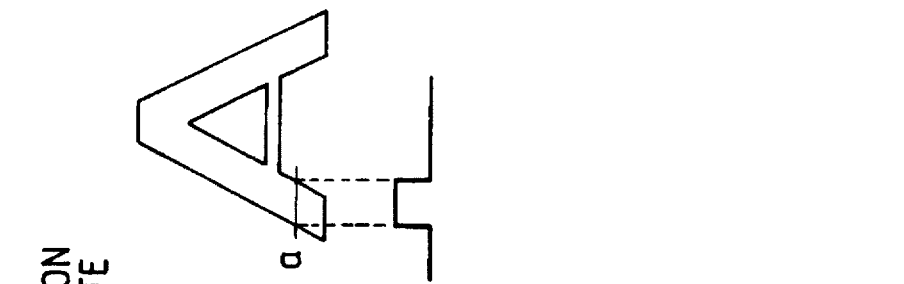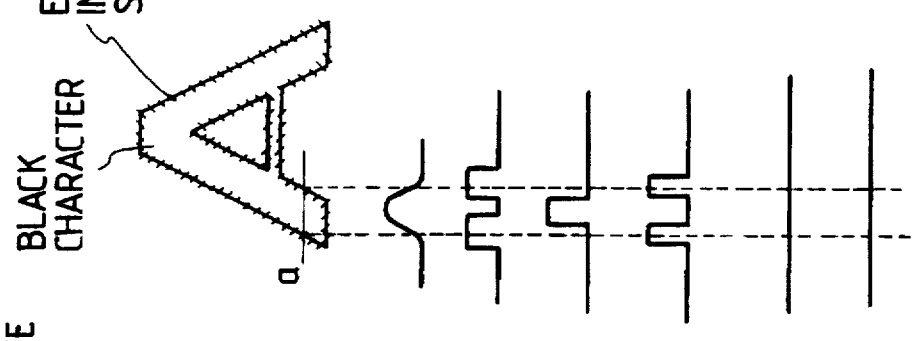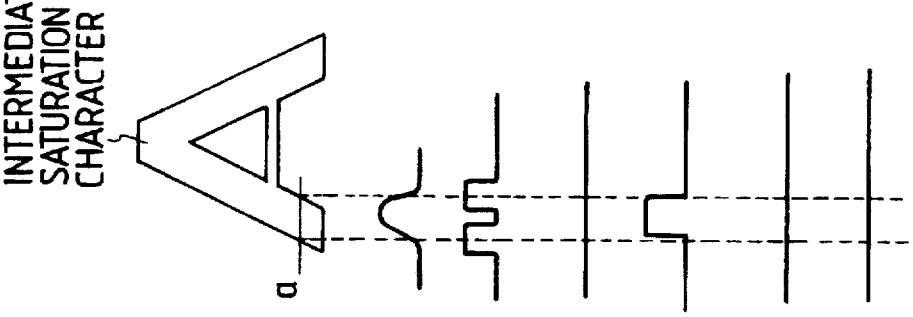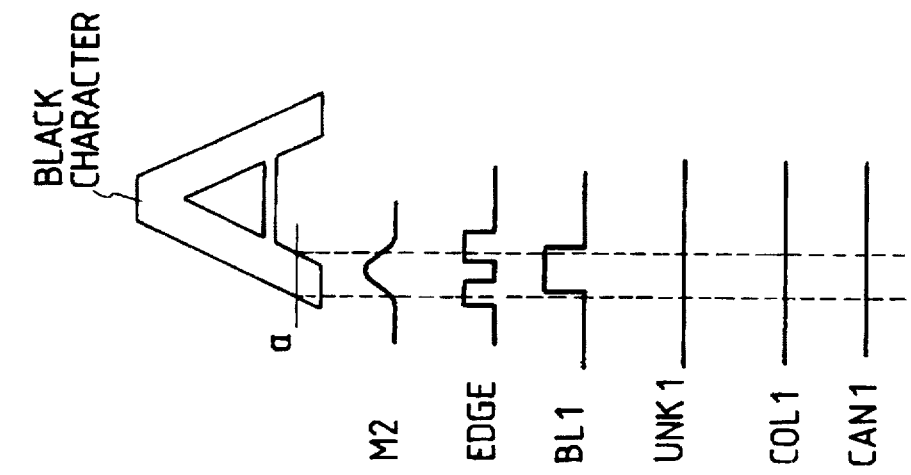

FIG. 14

| | EDGE | BL 1 | UNK 1 | COL 1 | PHASE = 0, 1, 2 (M, C, Y)<br>V4 | PHASE = 3 (Bk)<br>V4 |
|---|---|---|---|---|---|---|
| (a) | 1 | 1 | 0 | 0 | 0 | M2 |
| (c) | 1 | 0 | 1 | 0 | $\frac{V2}{2}$ | $\frac{V2}{2} + \frac{1}{2} M2$ |
| (e) | 1 | 0 | 0 | 1 | V2 | V2 |
| (f) | 0 | 1 | 0 | 0 | $\frac{3}{4} V2$ | $\frac{3}{4} V2 + \frac{1}{4} M2$ |
| (h) | 0 | 0 | X | X | V2 | V2 |

| PHASE | EDGE | BL 1 | UNK 1 | COL 1 | GAIN 1 | GAIN 2 |
|---|---|---|---|---|---|---|
| 0 ⟨ ⟩ 2 | 1 | 1 | 0 | 0 | 0 | 0 |
| | 1 | 0 | X | X | 4 | 0 |
| | 0 | 1 | 0 | 0 | 3 | 0 |
| | 0 | 0 | X | X | 4 | 0 |
| 3 | 1 | 1 | 0 | 0 | 0 | 4 |
| | 1 | 0 | 1 | 0 | 2 | 2 |
| | 1 | 0 | 0 | 1 | 4 | 0 |
| | 0 | 1 | 0 | 0 | 3 | 1 |
| | 0 | 0 | X | X | 4 | 0 |

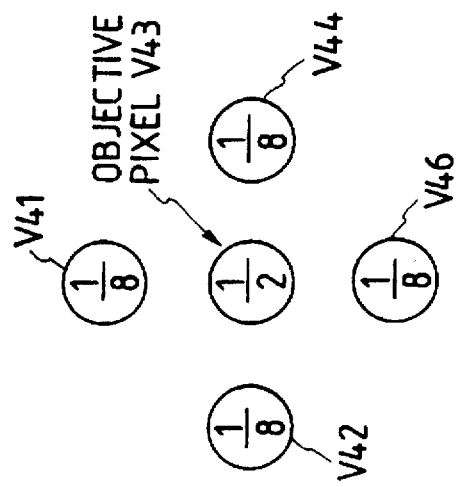
FIG. 21
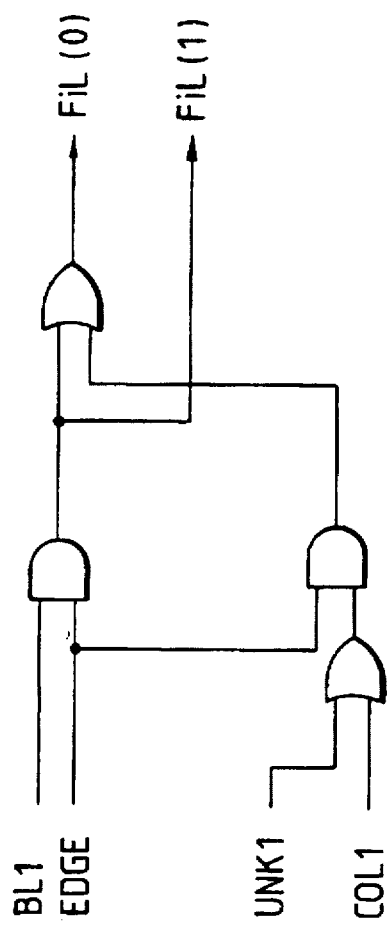
FIG. 19
FIG. 20
| | FiL(1) | FiL(0) | FILTER PROC | LOGICAL EXPRESSION |
|---|---|---|---|---|
| (a) | 0 | 1 | LOW-LEVEL EDGE EMPHASIS | (UNK1 ∪ COL1) ∩ EDGE |
| (b) | 1 | 1 | HIGH-LEVEL EDGE EMPHASIS | BL1 ∩ EDGE |
| (c) | x | 0 | SMOOTHING | OTHER THAN ABOVE |

| EDGE | BL1 | UNK1 | COL1 | GAM |
|------|-----|------|------|-----|
| 1 | 1 | 0 | 0 | 3 |
| 1 | 0 | 1 | 0 | 2 |
| 1 | 0 | 0 | 1 | 1 |
| 1 | 0 | 0 | 0 | 0 |
| 0 | x | x | x | 0 |

FIG. 28
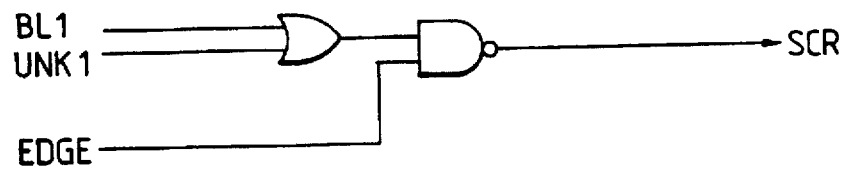
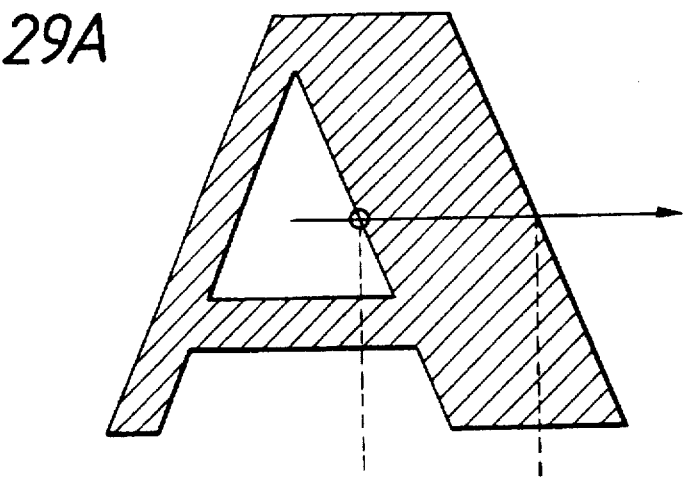
FIG. 29A
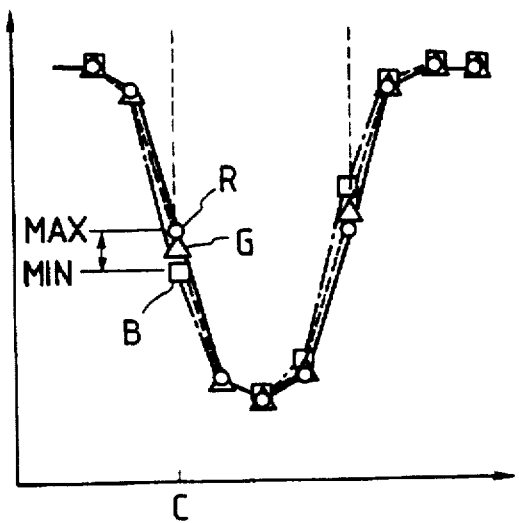
FIG. 29B

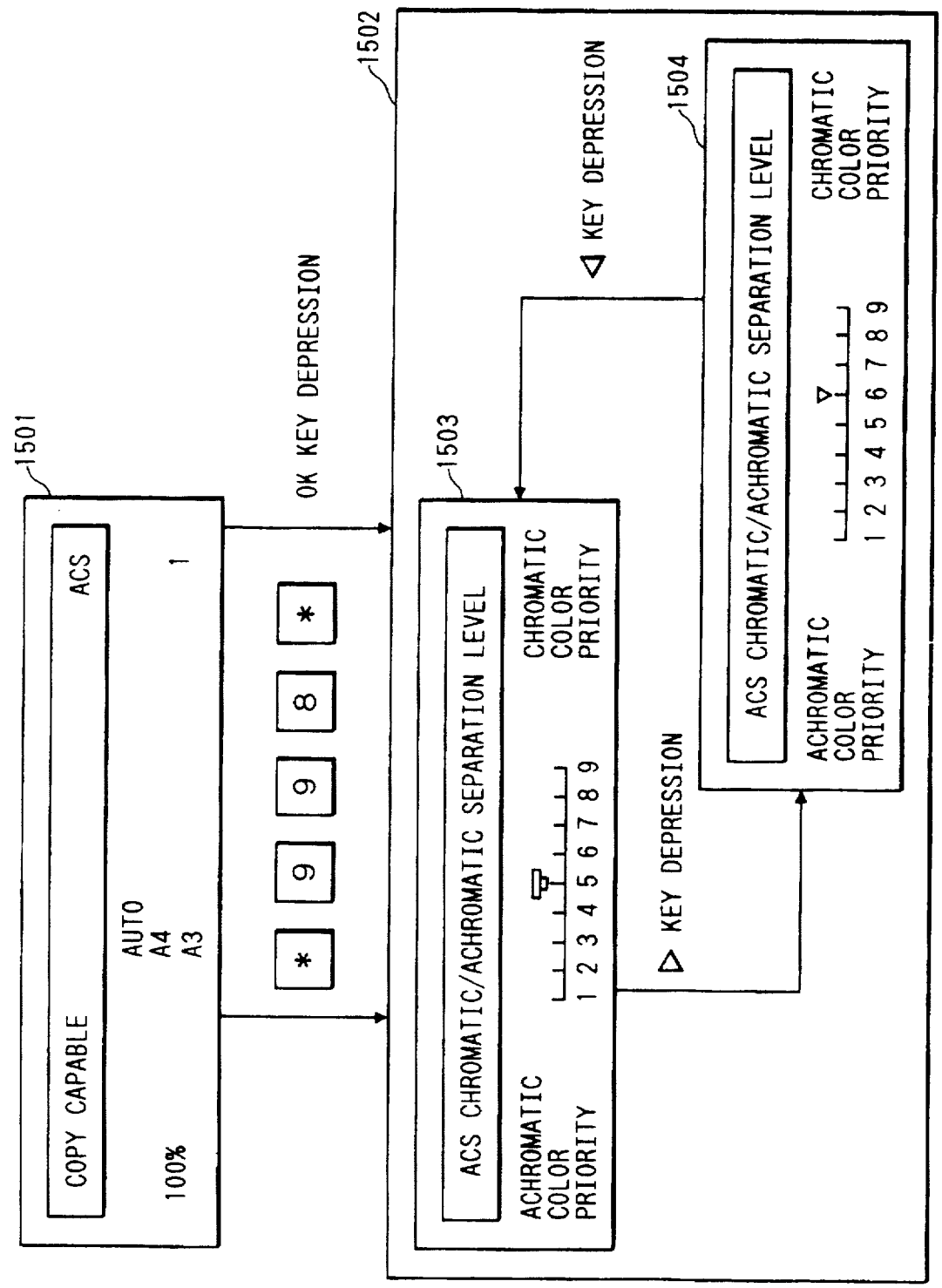

FIG. 39

| REGISTER \ SEPARATION LEVEL | 1 | 2 | 3 | 4 | 5 | 6 | 7 | 8 | 9 |
|---|---|---|---|---|---|---|---|---|---|
| iAR | 80 | 70 | 60 | 50 | 40 | 30 | 20 | 15 | 10 |
| iAG | 80 | 70 | 60 | 50 | 40 | 30 | 20 | 15 | 10 |
| iAB | 80 | 70 | 60 | 50 | 40 | 30 | 20 | 15 | 10 |
| iBR | 110 | 95 | 80 | 70 | 60 | 55 | 50 | 45 | 40 |
| iBG | 110 | 95 | 80 | 70 | 60 | 55 | 50 | 45 | 40 |
| iBB | 110 | 95 | 80 | 70 | 60 | 55 | 50 | 45 | 40 |
| iCR | 144 | 140 | 136 | 132 | 128 | 120 | 112 | 104 | 96 |
| iCG | 144 | 140 | 136 | 132 | 128 | 120 | 112 | 104 | 96 |
| iCB | 144 | 140 | 136 | 132 | 128 | 120 | 112 | 104 | 96 |
| WMN | 100 | 110 | 120 | 130 | 140 | 145 | 150 | 155 | 160 |
| WMX | 110 | 120 | 130 | 140 | 150 | 155 | 160 | 160 | 160 |

FIG. 41

| REGISTER \ SEPARATION LEVEL | 1 | 2 | 3 | 4 | 5 | 6 | 7 | 8 | 9 |
|---|---|---|---|---|---|---|---|---|---|
| KAR | 32 | 28 | 24 | 20 | 16 | 14 | 12 | 10 | 8 |
| KAG | 32 | 28 | 24 | 20 | 16 | 14 | 12 | 10 | 8 |
| KAB | 32 | 28 | 24 | 20 | 16 | 14 | 12 | 10 | 8 |
| KBR | 70 | 62 | 54 | 46 | 38 | 30 | 22 | 15 | 10 |
| KBG | 70 | 62 | 54 | 46 | 38 | 30 | 22 | 15 | 10 |
| KBB | 70 | 62 | 54 | 46 | 38 | 30 | 22 | 15 | 10 |
| KCR | 118 | 110 | 104 | 100 | 96 | 91 | 87 | 83 | 81 |
| KCG | 118 | 110 | 104 | 100 | 96 | 91 | 87 | 83 | 81 |
| KCB | 118 | 110 | 104 | 100 | 96 | 91 | 87 | 83 | 81 |
| iAR | 56 | 50 | 44 | 38 | 32 | 26 | 20 | 14 | 8 |
| iAG | 56 | 50 | 44 | 38 | 32 | 26 | 20 | 14 | 8 |
| iAB | 56 | 50 | 44 | 38 | 32 | 26 | 20 | 14 | 8 |
| iBR | 80 | 72 | 64 | 56 | 48 | 40 | 32 | 24 | 16 |
| iBG | 80 | 72 | 64 | 56 | 48 | 40 | 32 | 24 | 16 |
| iBB | 80 | 72 | 64 | 56 | 48 | 40 | 32 | 24 | 16 |
| iCR | 132 | 127 | 122 | 117 | 112 | 97 | 92 | 87 | 82 |
| iCG | 132 | 127 | 122 | 117 | 112 | 97 | 92 | 87 | 82 |
| iCB | 132 | 127 | 122 | 117 | 112 | 97 | 92 | 87 | 82 |

IMAGE PROCESSING APPARATUS

This application is a division of application Ser. No. 08/301,029, filed Sep. 6, 1994, which issued as U.S. Pat. No. 5,420,938 on May 30, 1995, which is a continuation of application Ser. No. 07/945,585, filed Sep. 16, 1992, now abandoned, which was a continuation of application Ser. No. 07/560,899, filed Jul. 31, 1990, now abandoned.

BACKGROUND OF THE INVENTION

1. Field of the Invention

The present invention relates to a judgment which is made as to an input signal in an image processing apparatus.

2. Related Background Art

The art of automatically judging whether an original is a monochrome original or a color original by judging an signal inputted to a color image processing apparatus, and executing a monochrome copy operation in the case of a monochrome original and a color copy operation in the case of a color original, is proposed in U.S. Pat. No. 4,953,012 by the same assignee as the present applicant.

The art of producing a clear copy without any color deviation of a black character portion contained in a color original by detecting the black character portion in the color original to print it in black only and by printing the remaining portions in color, is proposed by the same assignee as the present applicant in U.S. Pat. No. 5,119,185, U.S. Pat. No. 5,239,383 and U.S. Pat. No. 5,113,252.

However, an apparatus does not exist which has the sophisticated image processing capability to judge the kind of original—whether a monochrome original or a color original—and select a corresponding copy mode on the basis of the above-described art, and to extract a black character portion from the original and produce a printout without any color deviation.

If there are separately provided a judgment circuit for making the above-described automatic color judgment in which the kind of original—whether a monochrome original or a color original—is automatically judged and a judgment circuit for judging whether each pixel has black for the purpose of producing a black printout, the construction of the apparatus becomes complicated.

A judgment result may differ for an identical original due to the non-uniformity of the characteristics of individual reading optical systems.

In addition, even if an identical original is to be processed, individual operators make different judgments as to whether the original is a chromatic color original or an achromatic color original, according to their purposes of use, desires or the like.

SUMMARY OF THE INVENTION

It is therefore an object of the present invention to provide an image processing apparatus having a sophisticated judgment capability.

To achieve the above object, in accordance with the present invention, there is provided an image processing apparatus which comprises: determination means for determining whether input pixel data represents a monochromatic pixel or a chromatic pixel; first judgment means for judging whether one frame of an image represented by the input pixel data is a monochrome image or a color image on the basis of the determination result by said determination means; and second judging means for judging whether or not the input pixel data is part of a character which is black, on the basis of the determination result by the determination means.

In accordance with another aspect of the present invention, there is provided an image processing apparatus which comprises: first judgment means for judging on frame of whether an input image is a monochrome image or a color image on the basis of an input image signal; and second judgment means for judging whether or not a pixel represented by the input image signal is a part of a character which is black on the basis of the input image signal.

It is another object of the present invention to provide an image processing apparatus effectively utilizing the saturation of an input image.

To achieve the above object, in accordance with the present invention, there is provided an image processing apparatus which comprises: saturation judgment means for making a judgment as to whether each pixel has a chromatic color or an achromatic color on the basis of an input image signal; first judgment means for making a first judgment on the basis of a judgment result provided by the saturation judgment means; and second judgment means for making a second judgment different from the first judgment on the basis of the judgment result provided by the saturation judgment means.

It is another object of the present invention to provide an image processing method which makes it possible to provide a good image with efficiency.

To achieve the above object, in accordance with another aspect of the present invention, there is provided an image processing method comprising the steps of: a first judgment step for judging whether one frame of an input image is a monochrome image or a color image on the basis of an input image signal; and a second judgment step for judging whether or not a pixel represented by the input image signal is part of a character which is black on the basis of the input image signal.

In accordance with another aspect of the present invention, there is provided an image copying apparatus comprising: reading means for scanning an original during a prescanning operation and a main scanning operation and generating an image signal; first judgment means for judging whether the original is a monochrome original or a color original on the basis of the image signal generated by said reading means during the prescanning operation of the original by the reading means; and second judgment means for judging whether or not a pixel represented by the image signal is a part of a character which is black on the basis of the image signal generated by the reading means during the main scanning operation of the original by the reading means.

It is another object of the present invention to provide an image copying apparatus having good operability.

To achieve the above object, in accordance with the present invention, there is provided an image copying apparatus comprising: judgment means for effecting prescan of an original and making a judgment as to whether the original is a monochrome original or a color original; processing means for producing a copy of the original in accordance with a judgment result provided by the judgment means; and setting means for setting a mode which causes the judgment means to operate.

It is another object of the present invention to provide a simplified circuit construction.

It is another object of the present invention to provide an apparatus suitable for use in high-speed processing.

The above and other objects, features and advantages of the present invention will be apparent from the following description of preferred embodiments of the invention with reference to the accompanying drawings.

BRIEF DESCRIPTION OF THE DRAWINGS

FIGS. 5-A and 5-B are a view showing a MAX-MIN detecting circuit, and a corresponding truth table;

FIGS. 12A to 12D and FIGS. 13A to 13C are views showing signal levels of characters having different colors;

FIG. 14 is a table showing mixing conditions;

FIGS. 19 and 20 are views which serve to explain the switching conditions of the filter;

FIG. 21 is a view which serves to explain smoothing;

FIGS. 26 to 28 are views showing the switching of laser drive signals;

FIGS. 29A, 29B and 30A, 30B are views showing the signal levels of characters;

FIGS. 38A to 38C are views showing the setting of an ACS chromatic/achromatic colors separating level;

FIG. 39 is a view showing a specific example of the ACS chromatic/achromatic colors separating level;

FIG. 41 is a view showing a specific example of the chromatic/achromatic colors separation level for the black-character-character judgment.

DESCRIPTION OF THE PREFERRED EMBODIMENTS

Preferred embodiments of the present invention will be described in detail below with reference to the accompanying drawings.

[First Embpdiment]

Figure 2:
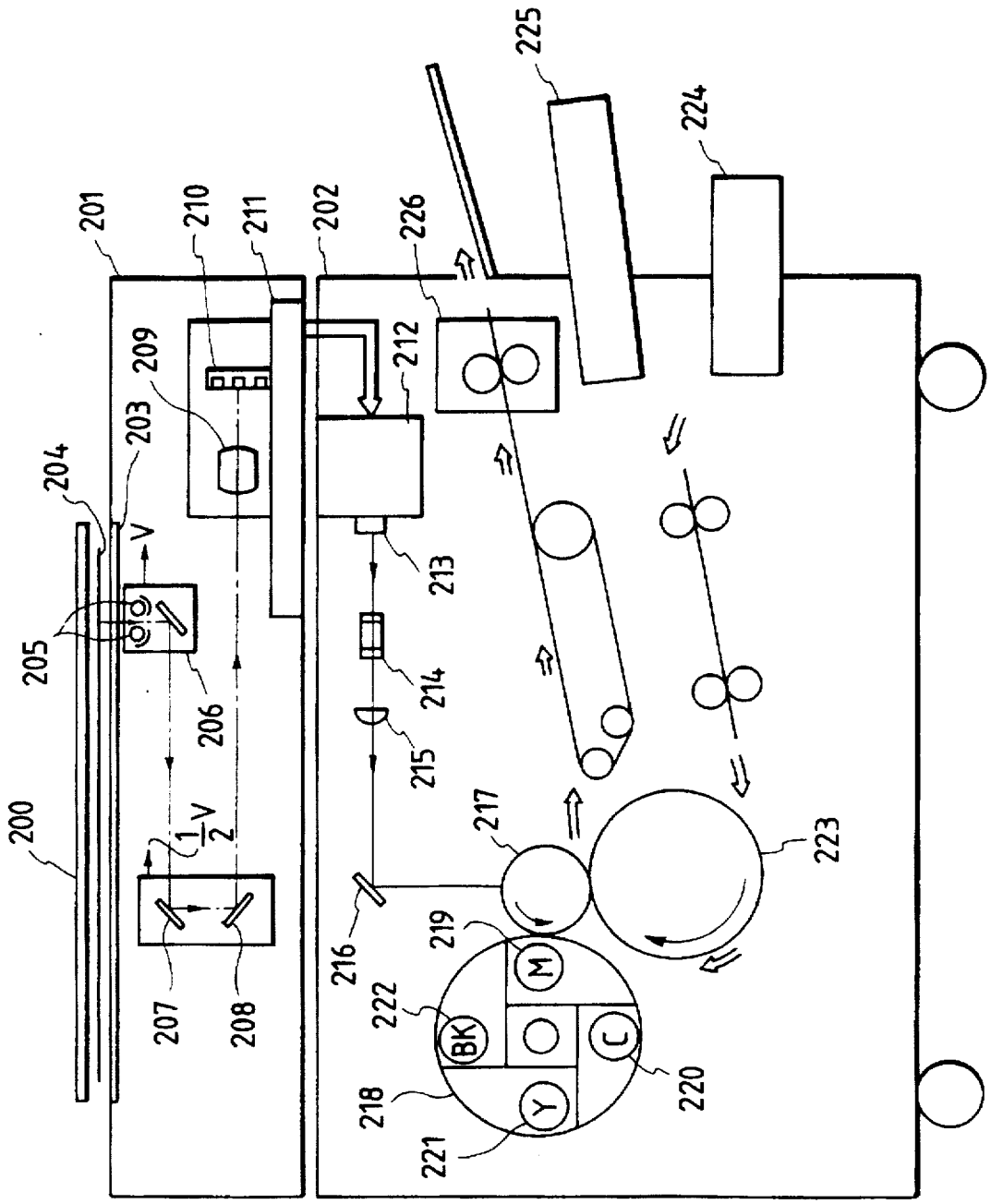
FIG. 2 is a diagrammatic view showing the entire construction of an image processing apparatus.

FIG. 2 is a schematic view showing the entire construction of a digital color copying machine to which a first embodiment of the present invention is applied.

The illustrated digital color copying machine comprises two major assemblies: an image scanner assembly 201 for effecting digital signal processing and a printer assembly 202 for printing on a sheet a full-color image corresponding to an original image read by the image scanner assembly 201.

The image scanner assembly 201 includes a pressure plate 200 having a mirror surface, and an original 204 is positioned in such as manner to be sandwiched between the pressure plate 200 and a platen glass (hereinafter referred to as a "platen") 203. The original 204 is illuminated by exposure devices 205, and reflected light is conducted toward a lens 209 along an optical path formed by mirrors 206, 207 and 208. The light image thus transmitted is formed on a sensor unit 210 including three line sensors which will be explained later (hereinafter referred to as a "sensor unit 210") by the lens 209, and full-color information including a red (R) component, a green (G) component and a blue (B) component is transmitted to a signal processing unit 211. The three-line sensor unit 210 includes R, G and B line sensors which are spaced apart from and parallel to one another, and generates a plurality of color component signals on the basis of different spectral characteristics.

The elements 205, 206 and the elements 207, 208 are arranged to scan the entire surface of the original 204 while mechanically travelling at velocities V and V/2, respectively, in a direction perpendicular to the electrical-scanning direction of the three-line sensor unit 210.

The signal processing unit 211 electrically processes and divides a readout signal into individual components of magenta (M), cyan (C), yellow (Y) and black (Bk), and transmits these components to the printer assembly 202. Each time one cycle of original scanning is performed in the image scanner assembly 201, one of the M, C, Y and Bk components is transmitted to the printer assembly 202. Thus, a single printout is produced through a total of four cycles of original scanning.

The M, C, Y or Bk image signal transmitted from the image scanner assembly 201 is in turn transmitted to a laser driver 212. The laser driver 212 drives a semiconductor laser 213 to generate a modulated laser beam in response to the image signal. The laser beam is conducted along an optical path formed by a polygon mirror 214, an f-θ lens 215 and a mirror 216, and scans a photosensitive drum 217.

A rotary developing assembly 218 comprises a magenta developing unit 219, a cyan developing unit 200, yellow developing unit 221 and a black developing unit 222. These four developing units are rotated to sequentially come into contact with the photosensitive drum 217, thereby developing with toner the electrostatic latent image formed on the same.

A transfer drum 223 is disposed adjacent to the photosensitive drum 217 so that a sheet fed from a sheet cassette 224 or 225 is wrapped around the transfer drum 223 to transfer the developed image from the photosensitive drum 217 to the sheet.

After the four colors M, C, Y and Bk are sequentially transferred in the above-described way, the sheet is discharged outwardly by way of a fixing unit 226.

Figure 3:
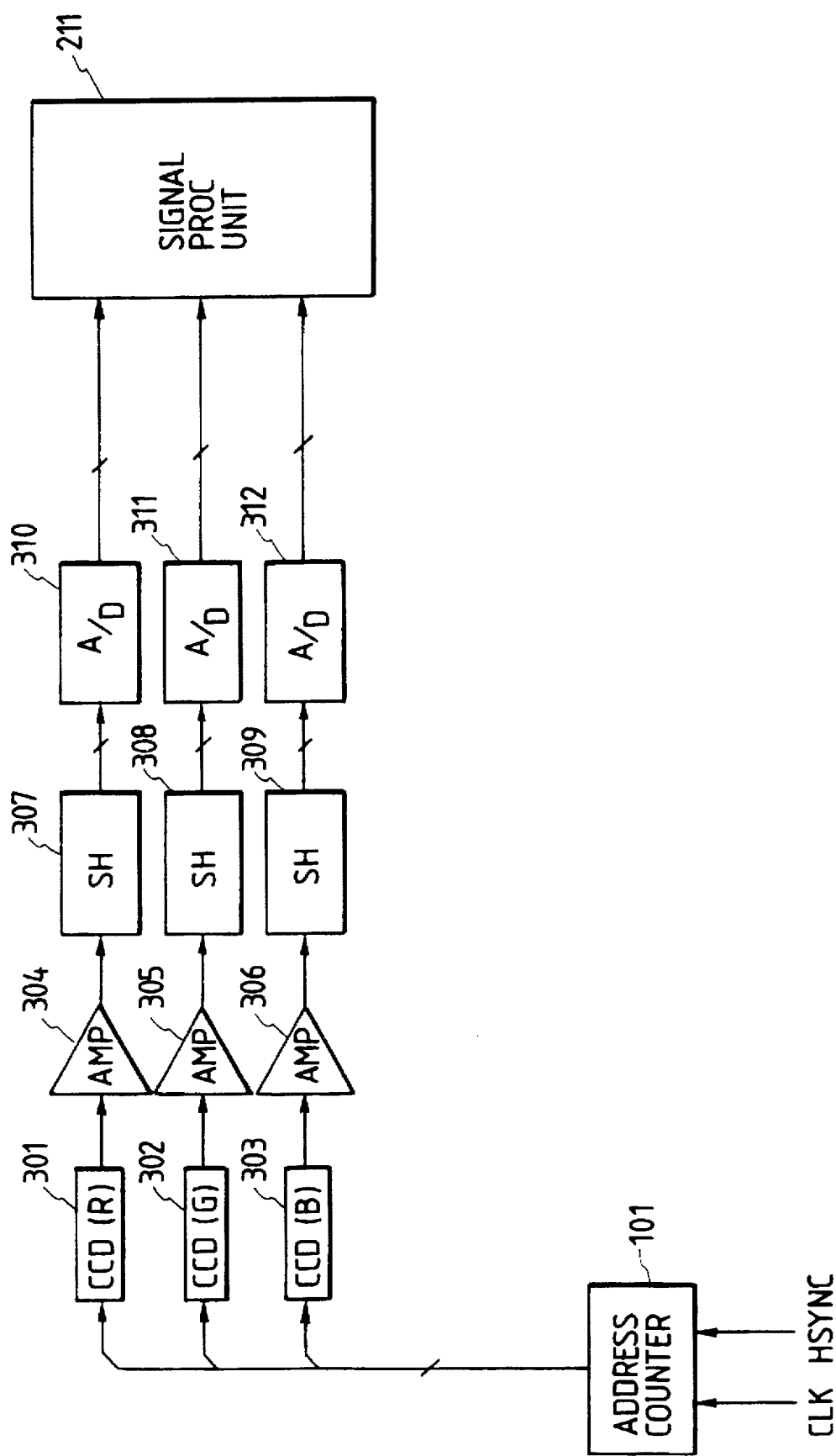
FIG. 3 is a block diagram showing an image scanner.

FIG. 3 is a block diagram showing the internal arrangement of the image scanner assembly 201. In FIG. 3, a counter 101 outputs a main-scan address 102 which serves to specify the main-scan position of the sensor unit 210. Specifically, if a horizontal synchronizing signal HSYNC is "1", the counter 101 is set to a predetermined value by a central processing unit (not shown), whereas if the counter 101 receives a clock signal CLK corresponding to each pixel, the count of the counter 101 is incremented.

The image formed on the sensor unit 210 is photoelectrically converted into readout signals of R, G and B components by three line sensors 301, 302 and 303, respectively. The respective readout signals are then converted into 8-bit digital image signals 313 (R), 314 (G) and 315 (B) by way of amplifiers 304, 305 and 306, sample-and-hold circuits 307, 308 and 309 and A/D converters 310, 311 and 312. The 8-bit digital image signals 313 (R), 314 (G) and 315 (B) are outputted to the signal processing unit 211.

[Flow of Each Signal]

Figure 1:
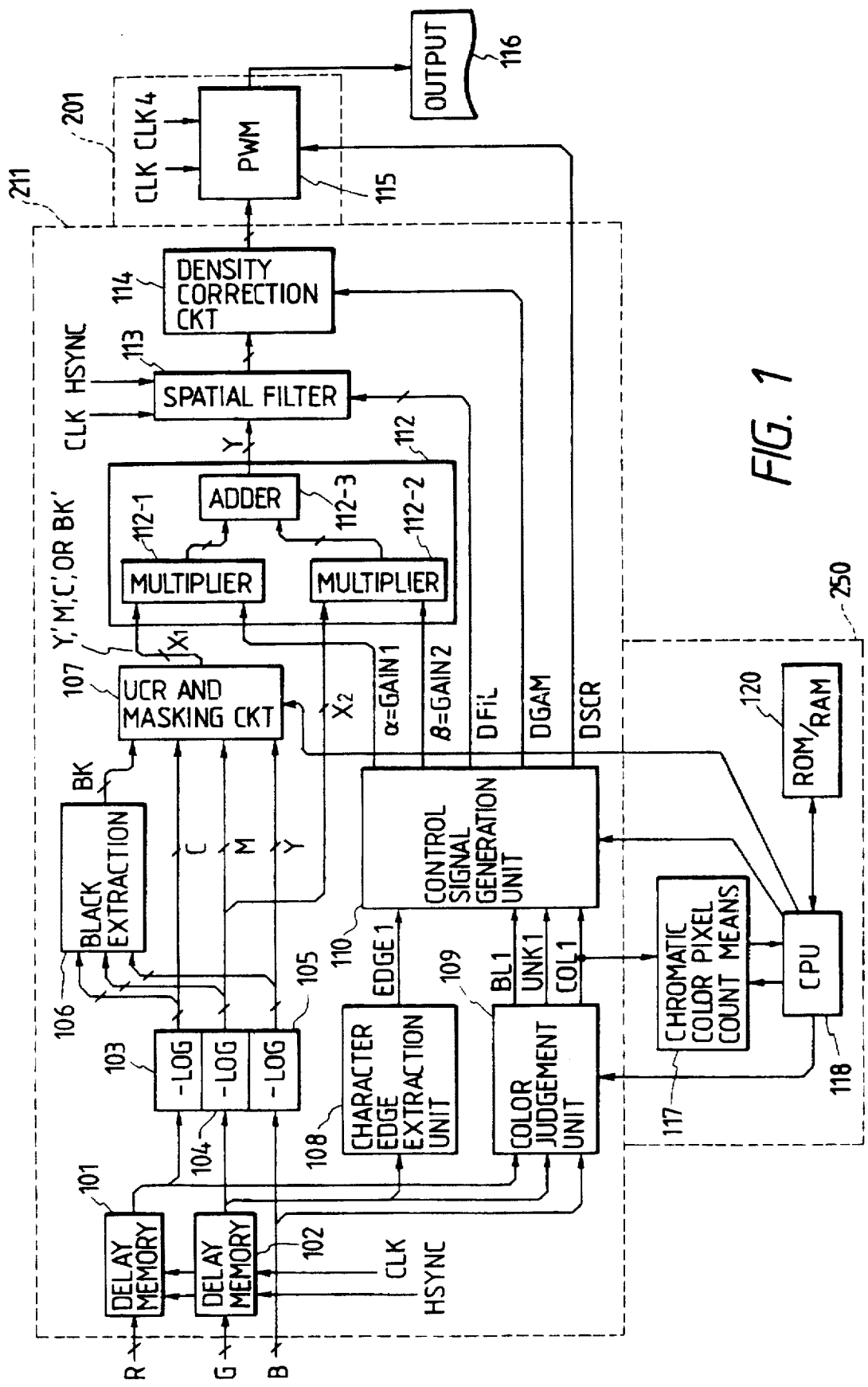
FIG. 1 is a block diagram showing the entire circuit of a first embodiment of the present invention.

FIG. 1 is a block diagram showing the flow of each signal in the signal processing unit 211 and associated elements in the first embodiment.

In the illustrated arrangement, the element indicated by 211 represents the signal processing unit shown in FIG. 2, an element 201 the printer assembly, and an element 250 a control unit including a CPU.

The clock signal CLK serves to transfer each pixel, and the horizontal synchronizing signal HSYNC serves as a synchronizing signal for initiating a main scan. A clock signal CLK4 serves to generate a high-resolution 400-line (400-dot-per-inch) screen which will be described later. The waveform of each of the clock signal CLK, the horizontal synchronizing signal HSYNC and the clock signal CLK4 is as shown in FIG. 9.

Figure 9:
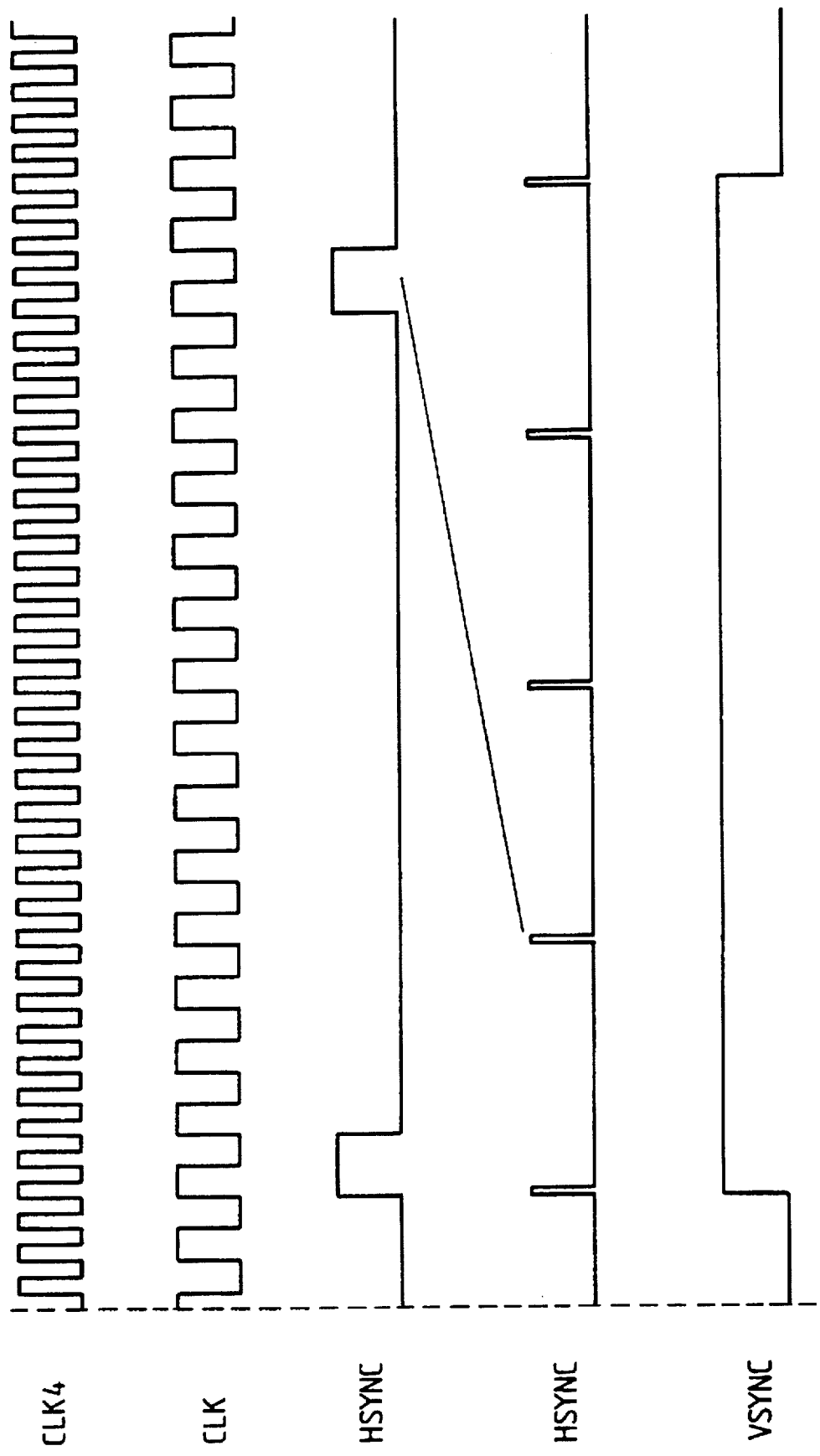
FIG. 9 is a timing chart.

In FIG. 9, a waveform VSYNC represents a signal for defining an image output interval during sub-scan.

Delay memories 101 and 102 are arranged to correct the differences in space between the three-line sensors 301, 302 and 303. The delay memory 101 introduces a delay for 36 lines, while the delay memory 102 introduces a delay for 18 lines. Each of the delay memories 101 and 102 may be, for example, an FIFO (first-in first-out) memory.

Negative logarithmic transformation (−LOG transformation) circuits 103, 104 and 105 are arranged to effect luminance-to-density conversion and to generate complementary-color signals.

More specifically, the −LOG transformation circuits 103, 104 and 105 generate C (cyan), M (magenta) and Y (yellow) signals for R, G and B on the basis of the following relations, respectively:

$$\begin{cases} C = -\log R \\ M = -\log G \\ Y = -\log B \end{cases}$$

A black-component extracting circuit 106 generates a black-component (Bk) signal on the basis of the following relation:

$$Bk = \min(Y, M, C)$$

An UCR (undercolor removal) and masking circuit 107 removes an undercolor (black) component and corrects the differences between the spectral sensitivity characteristic of the sensor unit 210 and that of toner used in the printer assembly. The circuit 107 generates Y', M', C' and Bk' signals from which an actual developed toner image is formed.

A character edge extraction unit 108 detects the continuity of the edge component of a G (green) component signal to detect a character edge, thereby generating a signal EDGE1. A color judgment unit 109 receives the three primary-color signals R, G and B to selectively generate a signal BL1 indicating that a readout signal corresponds to black or a signal COL1 indicating that the readout signal corresponds to a chromatic color.

A control signal generation unit 110 generates control signals for input to various circuits which will be described later, on the basis of the result of a judgment made by each of the character edge extraction unit 108 and the color judgment unit 109.

A mixing circuit 112 for mixing a color signal and a monochromatic black signal is arranged to multiply an output X1 (Y', M', C' or Bk') of the UCR/masking circuit 107 by a weight α=GAIN1 and a signal X2 (M), which is not passed through the UCR/masking circuit 107, by a weight β=GAIN2, thereby providing an output Y=α×X1+β×X2 (α, β=0 to 1).

The signal output from the mixing circuit 112 is filtered by a spatial filter 113 and corrected for density by a density correction circuit 114, and a laser unit is driven by a PWM (pulse width modulation circuit) 115 to provide an image output 116.

The controlling unit 250 comprises a CPU 118 for providing control over all the elements.

A block 120 including a ROM and a RAM stores a control program and data. A chromatic color pixel counting circuit 117 serves to count the number of chromatic color pixels contained in the original image.

Figure 4:
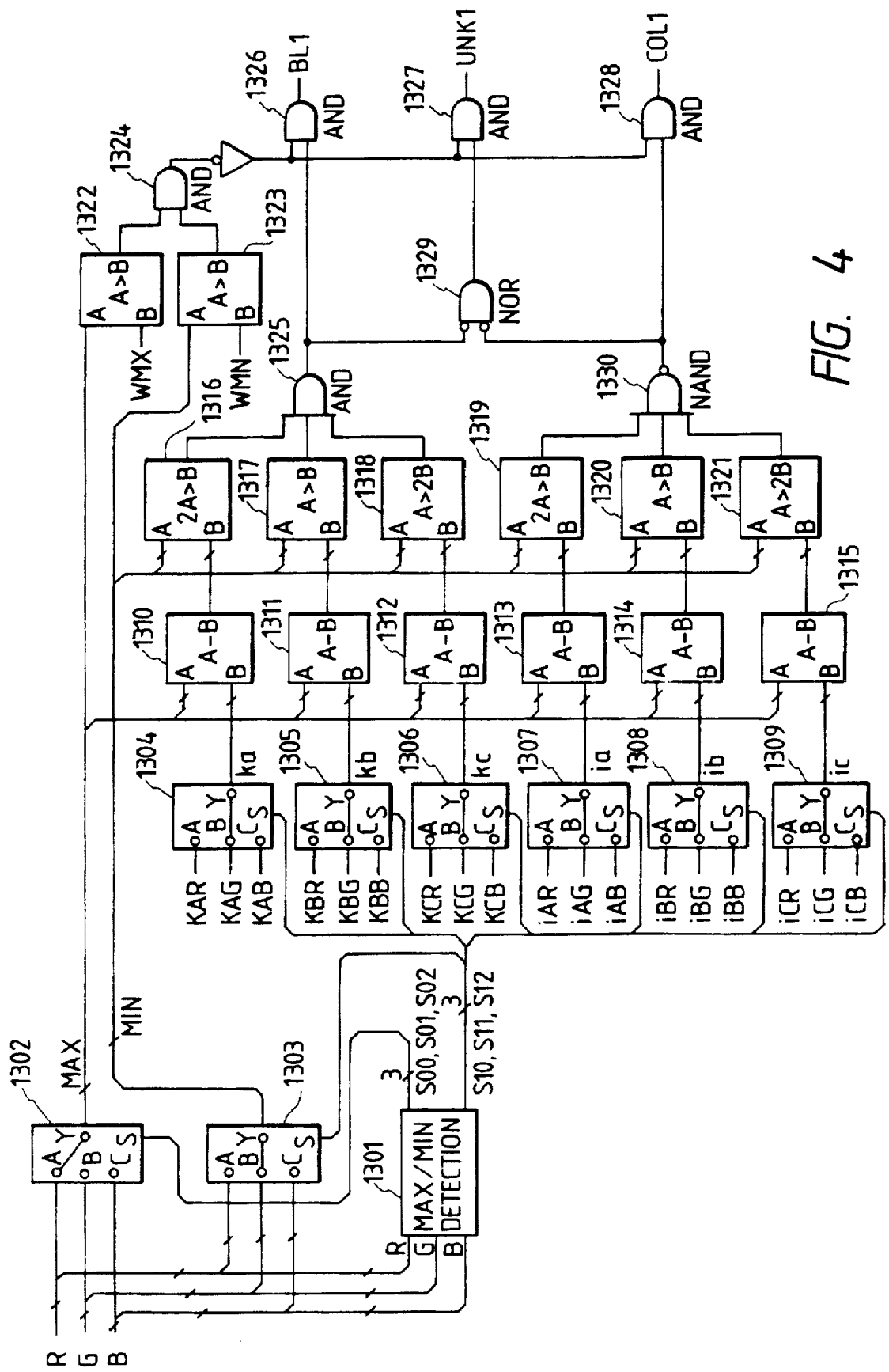
FIG. 4 is a block diagram showing a color judgment unit.

FIG. 4 is a block diagram which serves to illustrate the judgment as to saturation which is made by the color judgment unit 109 of FIG. 1.

Referring to FIG. 4, the color judgment unit 109 comprises a MAX/MIN detector 1301, selectors 1302 to 1309, subtracters 1310 to 1315 each of which produces an output A-B from inputs A and B, and comparators 1316 to 1323 each having inputs A and B. Each of the comparators 1316 and 1319 produces an output "1" for 2A>B, each of the comparators 1317, 1320, 1322 and 1323 produces an output "1" for A>B, and each of the comparators 1318 and 1321 produces an output "1" for A>2B; otherwise, these comparators provide outputs "0", respectively. The color judgment unit 109 also comprises AND gates 1324 to 1328, a NOR gate 1319 and a NAND gate 1130.

In the aforesaid construction and arrangement, a circuit such as that shown in FIG. 5-1 may be employed as the MAX/MIN detector 1301. As shown in FIG. 5-1, comparators 1350, 1351 and 1352 produce outputs "1" for R>G, G>B and B>R, respectively. The circuit shown in FIG. 5-1 generates judgment signals S00, S01, S02, S10, S11 and S12, as shown in FIG. 5-2.

If an R signal has the maximum value (MAX) or the R signal and G and B signals have equal values, the signal S00 is set to "1" and the signals S01 and S02 are set to "0".

If the G signal has the maximum value, the signal S01 is set to "1" and the signals S00 and S02 are set to "0".

If the B signal has the maximum value, the signal S02 is set to "1" and the signals S00 and S01 are set to "0".

If the R signal has the minimum value (MIN) or the R signal and G and B signals have equal values, the signal S10 is set to "1" and the signals S11 and S12 are set to "0".

If the G signal has the minimum value, the signal S11 is set to "1" and the signals S10 and S12 are set to "0".

If the B signal has the minimum value, the signal S12 is set to "1" and the signals S10 and S11 are set to "0".

For example, if the R signal has the maximum value, the comparators 1350 and 1352 produce outputs "1" and "0" because R>G and R≧B. An AND gate AND1 and an OR gate OR1 produce outputs "1", respectively. AND gates AND2 and AND3 produce outputs "0", that is, the signal S00 is set to "1", while the signals S01 and S02 are set to "0". The result obtained by making the above-described judgments is shown in FIG. 5-2 in table form.

The outputs S00, S01 and S02 from the MAX/MIN detector 1301 are inputted to the selector 1302, while the outputs S10, S11 and S12 are inputted to each of the selectors 1303 to 1309.

Figures 6A, 6B:
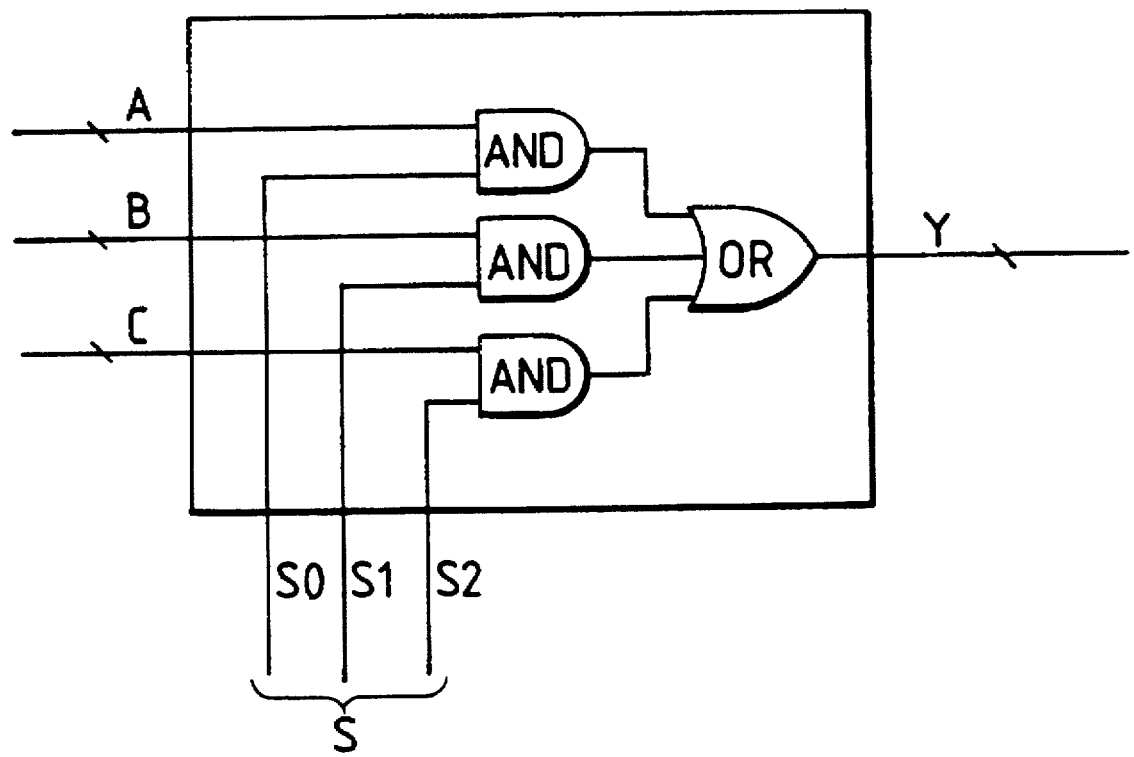
FIGS. 6-A and 6-B are a circuit diagram of a selector and a corresponding truth table.

As shown in FIG. 6-1, each of the selectors 1302 to 1309 includes AND circuits and an OR circuit. As shown in FIG. 6-2, each of these selectors has inputs A, B and C, and outputs the signal A for S0=1 and S1=S2=0, the signal B for S1=1 and S0=S2=0, and the signal C for S2=1 and S0=S1=0. In the first embodiment, the inputs A, B and C correspond to the R, G and B signals, respectively.

Figures 7A, 7B:
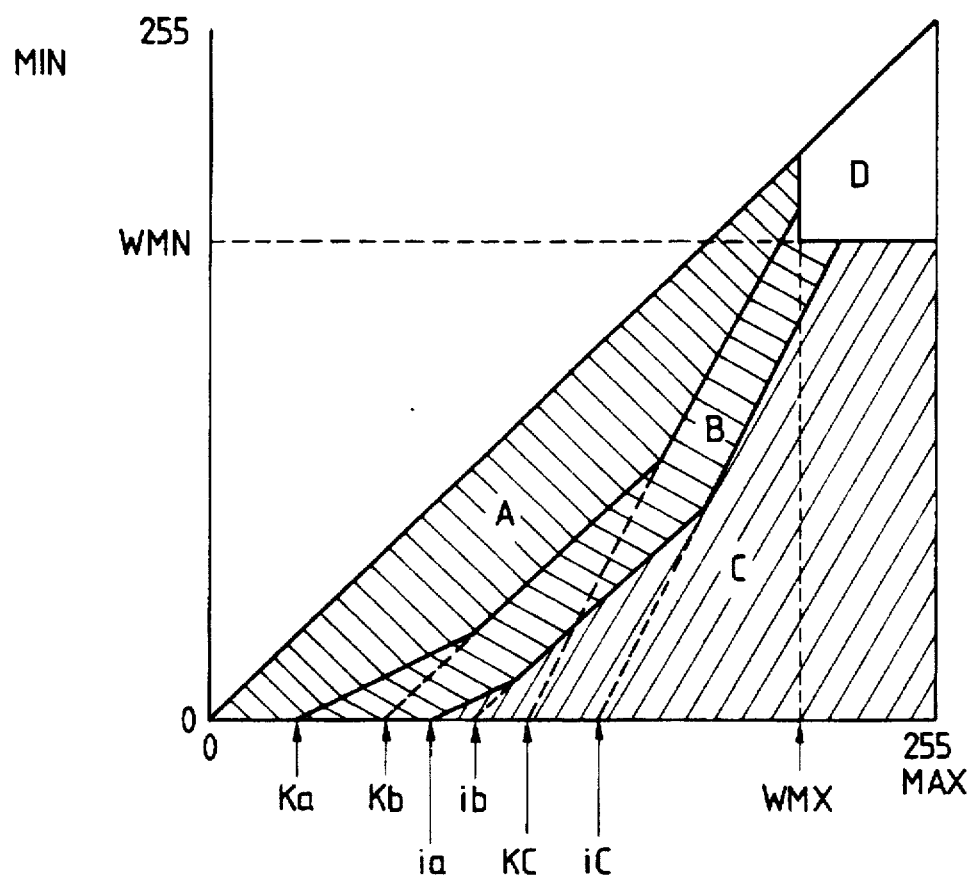
FIGS. 7-A and 7-B are a diagram showing judgment references and a table showing judgment signals.

The pixel color judgment according to the first embodiment is accomplished by selecting signals having the maximum and minimum values, respectively, from the R, G and B signals and setting the value of the maximum-value signal to "MAX" and that of the minimum-value signal to "MIN", and by utilizing four divided areas A, B, C and D as shown in FIG. 7-1.

Specifically, a MAX-MIN plane is divided by means of linear simultaneous inequalities using MAX and MIN as parameters by utilizing the property that although the difference between MAX and MIN is small in an achromatic area, the difference between MAX and MIN becomes greater nearer to a chromatic color.

More specifically, predetermined constants ka, kb, kc, ia, ib, ic, WMX and WMN are prepared and the four divided areas A, B, C and D such as those shown in FIG. 7-1 are formed.

The area A is a dark achromatic color (black) area. (MAX, MIN) is contained in the area A if the following condition is satisfied:

$$MIN \leq WMN \text{ or } MAX \leq WMX$$

and if all the following conditions are satisfied:

$$\begin{cases} MAX - ka < 2MIN \\ MAX - kb < MIN \\ MAX - kc < 1/2MIN \end{cases}$$

The area B is an area intermediate between the dark achromatic color area and a chromatic color area. (MAX, MIN) is contained in the area B if the following condition is satisfied:

$$MIN \leq WMN \text{ or } MAX \leq WMX$$

and if any one of the following conditions is satisfied:

$$\begin{cases} MAX - ka \geq 2MIN \\ MAX - kb \geq MIN \\ MAX - kc \geq 1/2MIN \end{cases}$$

and, in addition, if all the following conditions are satisfied:

$$\begin{cases} MAX - ia < 2MIN \\ MAX - ib < MIN \\ MAX - ic < 1/2MIN \end{cases}$$

The area C is a chromatic color area. (MAX, MIN) is contained in the area C if the following condition is satisfied:

$$MIN \leq WMN \text{ or } MAX \leq WMX$$

and if any one of the following conditions is satisfied:

$$\begin{cases} MAX - ia \geq 2MIN \\ MAX - ib \geq MIN \\ MAX - ic \geq 1/2MIN \end{cases}$$

The area D is a bright chromatic color (white) area. (MAX, MIN) is contained in the area D if both the following conditions are satisfied:

$$\begin{cases} MIN > WMN \\ MAX > WMN \end{cases}$$

FIG. 7-2 is a table showing output signals corresponding to the respective A, B, C and D areas.

If (MAX, MIN) is contained in the area A, a signal BL1 is set to "1", while signals UNK1 and COL1 are set to "0".

If (MAX, MIN) is contained in the area B, the signal UNK1 is set to "1", while the signals BL1 and COL1 are set "0".

If (MAX, MIN) is contained in the area C, the signal COL1 is set to "1", while the signals BL1 and UNK1 are set to "0".

If (MAX, MIN) is contained in the area D, the signals BL1, UNK1 and COL1 are set to "0".

The circuit elements 1304 to 1330 shown in FIG. 4 cooperate with one another to make a judgment as to each of the above-described areas. In operation, the selectors 1302 and 1303 respectively select a MAX signal and a MIN signal from among the input R, G and B signals in response to the corresponding outputs from the MAX/MIN detector 1301. In cooperation with the selector 1303, the selectors 1304 to 1309 selectively determine the values of the constants ka, kb, kc, ia, ib and ic, respectively. These constants are stored in the ROM/RAM block 120 and can be set by the CPU 118. For example, if the R and G signals correspond to MAX and MIN, respectively, the selectors 1304, 1305, 1306, 1307, 1308 and 1309 selects values KAG, KBG, KCG, iAG, iBG and iCG and set them to the constants ka, kb, kc, ia, ib and ic, respectively. The reason why the values of the constants ka, kb, kc, ia, ib and ic are changed depending on which of the R, G and B signals has the minimum value, is as follows.

Figure 8:
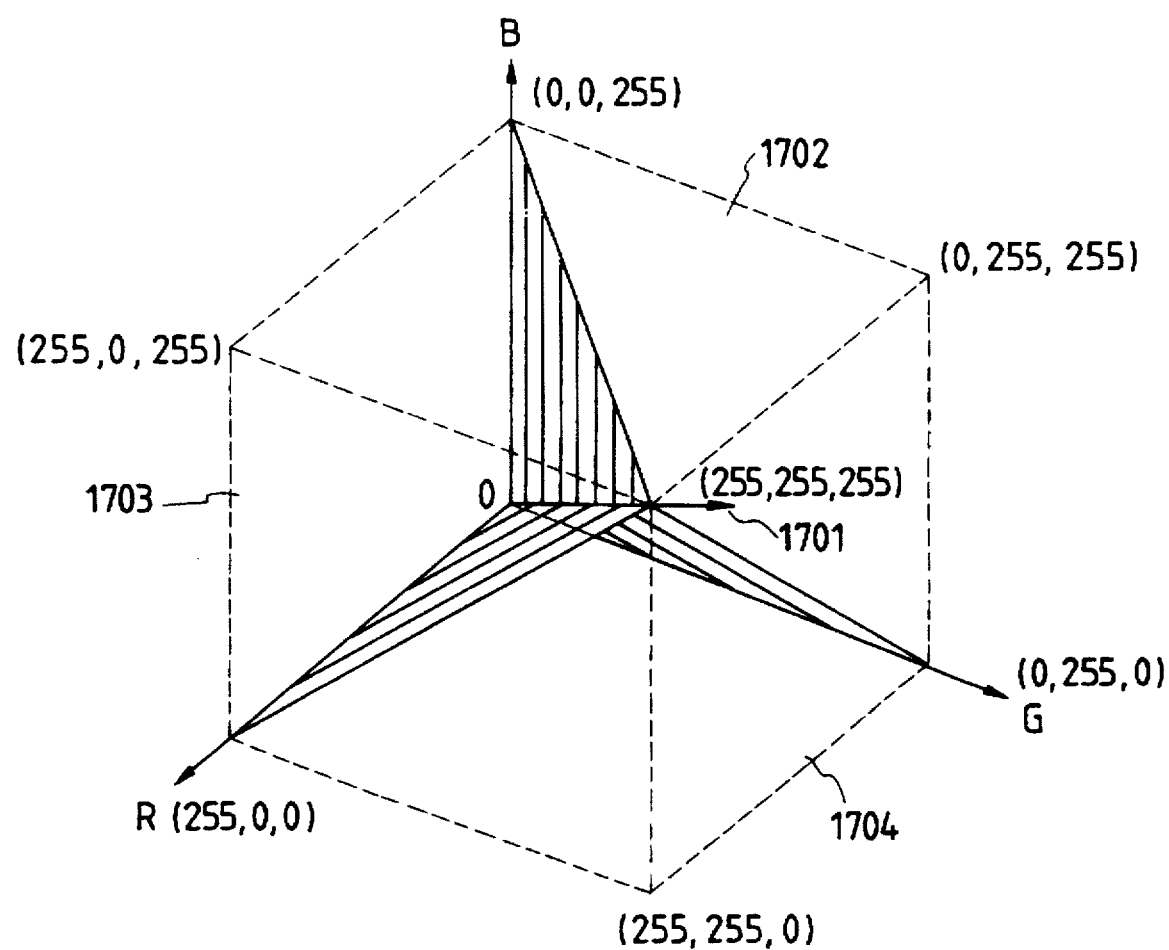
FIG. 8 is a view showing an R, G, B space.

In general, individual full color sensors have inherent color balances, and if a judgment as to the chromatic/ achromatic colors is made on the basis of an identical criterion with respect to all the colors, an erroneous judgment will result. To cope with the differences between the color balance characteristics of individual sensors, a three-dimensional space R-G-B is divided into three parts as shown in FIG. 8. As shown, the three-dimensional space R-G-B is divided into an area 1702 corresponding to MIN= R, an area 1703 corresponding to MIN=G, and an area corresponding to MIN=B, and the values of the constants ka, kb, kc, ia, ib and ic which correspond to each of the areas are employed.

For example, in the case of a sensor of the type which produces an R-component signal at a low level with respect to G- and B-component signals, the values KAR, KBR, KCR, iAR, iBR and iCR in FIG. 4 are made a little greater than the remaining associated values, whereby, for MIN=R, the areas A and C of the areas shown in FIG. 7-1 can be made wider and narrower, respectively. Accordingly, it is possible to accurately compensate for the color balances of various sensors.

The subtracter 1310 and the comparator 1316, the subtracter 1311 and the comparator 1317, and the subtracter 1312 and the comparator 1318 respectively make judgments as to:

which of MAX-ka and 2MIN is greater,
which of MAX-kb and MIN is greater, and
which of MAX-kc and 1/2MIN is greater.

The subtracter 1313 and the comparator 1319, the subtracter 1314 and the comparator 1320, and the subtracter 1315 and the comparator 1321 respectively make judgments as to:

which of MAX-ia and 2MIN is greater,
which of MAX-ib and MIN is greater, and
which of MAX-ic and 1/2MIN is greater.

The comparators 1322 and 1232 respectively make judgments as to:

which of MAX and WMX is greater, and
which of MIN and WMN is greater.

In this manner, the above-described area judgment is made and the results are outputted as the judgment signals BL1, UNK1 and COL1.

The color judgment unit 109 may also be constituted by a ROM or RAM which stores the values of BL1, UNK1 AND COL1 corresponding to the input R, G and B signals.

[Outline of Process Flow]

Figure 10:
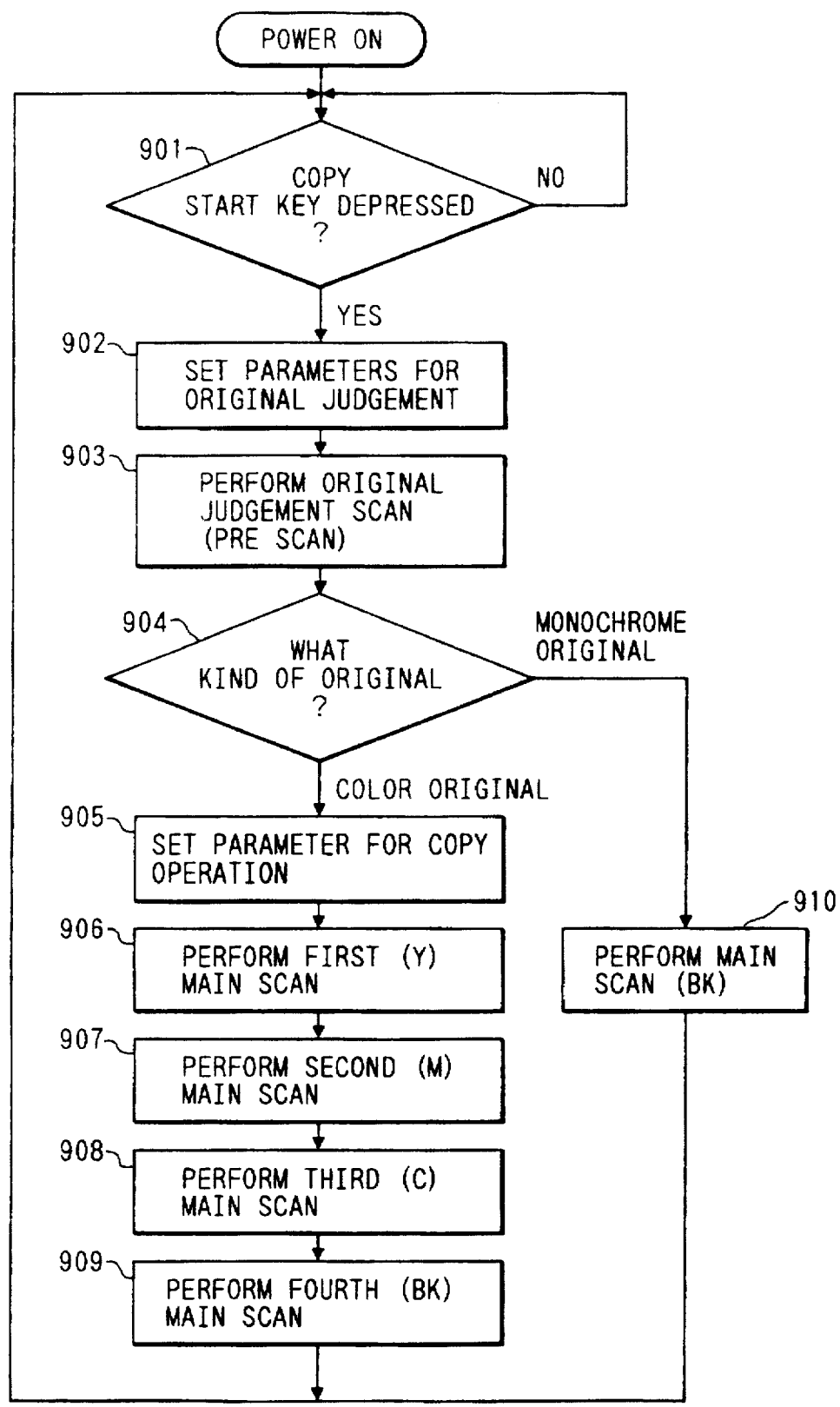
FIG. 10 is a flow chart showing the flow of the entire processing.

FIG. 10 shows a process flow for use in an image processing apparatus according to the above-described embodiment.

After an electrical power source has been turned on, if it is determined in Step 901 that a copy start key has been depressed, a copying operation is initiated and the process proceeds to Step 902.

In Step 902, parameters for judging whether an original of interest is a color original or a monochrome original, that is, the aforesaid constants ka, kb, kc, ia, ib, ic, WMX and WMN are set in the color judgment unit 109.

In Step 903, an original judgment scan (prescan) is performed to judge whether the original is a color original or a monochrome original. During the original judgment scan, a reader unit operates but the printer unit does not operate.

If it is judge in Step 904 from such an original judgment that there is a color original, the process proceeds to Step 905, where a full color copying operation is initiated. If it is judge in Step 904 that there is a monochrome original, the process proceeds to Step 910, where a monochrome copying operation is initiated.

For the color copying operation, in Step 905, the parameters required for the same are set in the color judgment unit 109, that is, parameters ka', kb', kc', ia', ib', ic', WMX' and WMN' are set which differ from the corresponding parameters for the prescan.

Then, a main scan, or scan for four-color printing, is performed by a total of four times through Steps 906 to 909. The signal obtained and processed in each main scan is outputted to the printer assembly 202, and M, C, Y and Bk toners are laid over a recording sheet at real time during the respective main scans, whereby full color reproduction is performed.

For the monochrome copying operation, in Step 910, the main scan is performed once to produce a monochrome copy with Bk toner only.

[Original Judgment]

The following is an explanation of a method of judging whether an original of interest is a monochrome original or a color original.

As described above, a judgment as to whether an original of interest is a monochrome original or a color original is made during the original judgment scan. In the original judgment scan, the chromatic color pixel counting circuit 117 counts the number of signals COL1 indicating that a pixel of interest is a chromatic pixel color, which are outputted from the color judgment unit 109 of FIG. 1, thereby making a judgment as to whether the original is a color original or a monochrome original.

Figure 11:
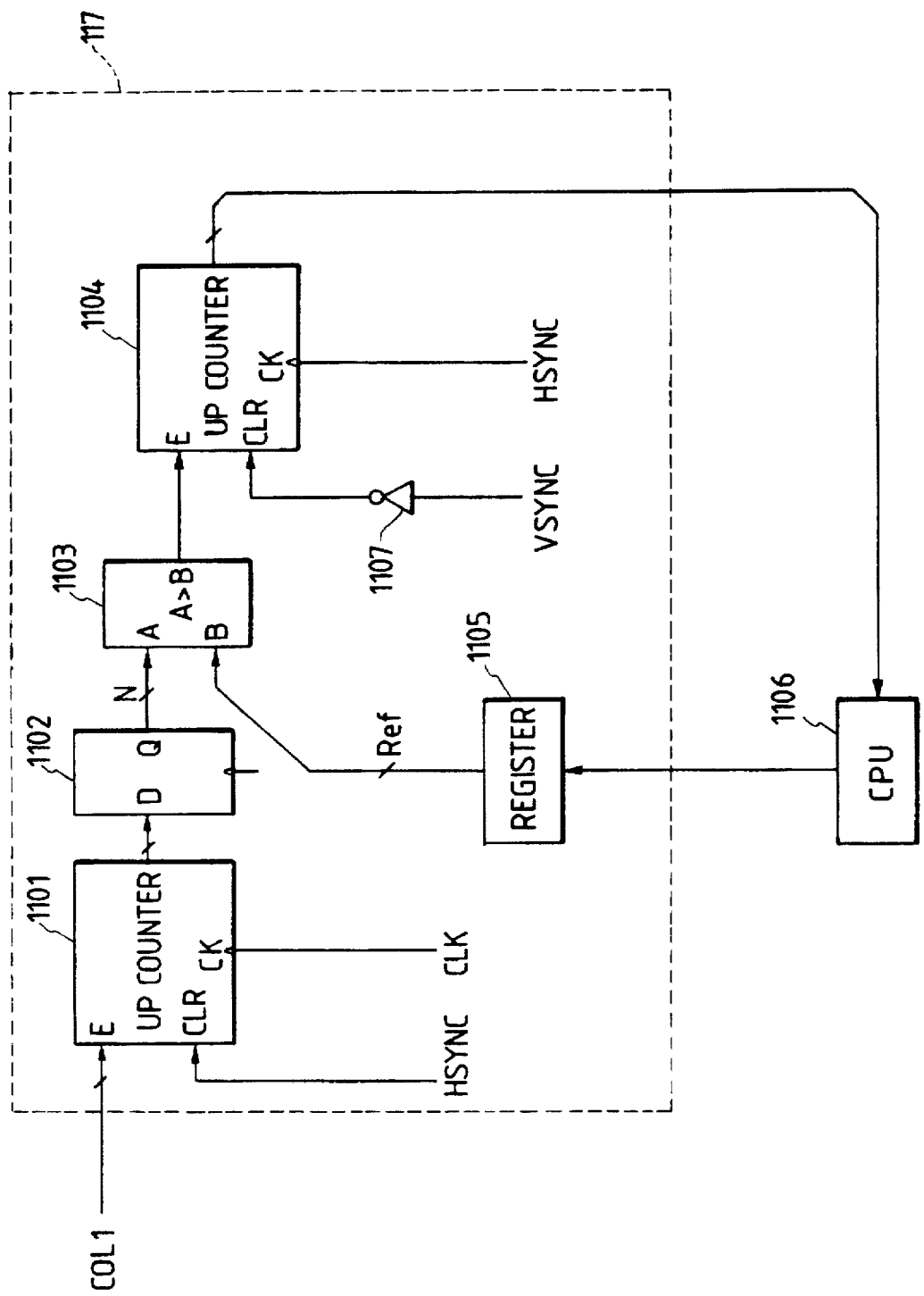
FIG. 11 is an achromatic-color pixel counting circuit.

FIG. 11 is a block diagram showing a chromatic color pixel counting means 117.

The chromatic color pixel counting means 117 comprises an up counter 1101 and a flip-flop 1102. The up counter 1101 clears its count in response to the signal HSYNC, and increments the count in synchronism with the signal CLK while the signal COL1 is "1". The resultant value N of chromatic pixel contained in one line is held by the flip-flop 1102.

The chromatic color pixel counting means 117 also comprises a register 1105 which holds a value Ref set in advance by the CPU 1106.

A digital comparator 1103 compares the values N and Ref to produce the following output:

$$\begin{cases} \text{``1'' if } N > Ref \\ \text{``0'' if } N \leq Ref \end{cases}$$

The chromatic color pixel counting means 117 also comprises an up counter 1104 similar to the up counter 1101, as well as an inverter 1107. The up counter 1104 clears its count while the signal VSYNC is "0", and if the output of the comparator 1108 is "1", the count of the up counter 1104 is incremented in synchronism with the signal HSYNC.

As an appropriate value is set to Ref in advance, the number of lines each containing chromatic pixels, which are not less than Ref in number, is outputted from the up counter 1104 to the CPU 1106.

On the basis of the number of lines, the CPU 1106 makes a judgment as to whether the original is a color original or a monochrome original. Specifically, the number of lines each containing chromatic pixels is transmitted to the CPU 1106, and if the number of lines is greater than a certain number of lines, the CPU 1106 judges that the original is a color original. Accordingly, it is possible to implement a judgment process which is not influenced by noise.

Although the above-described embodiment makes a judgment for each line, the number of chromatic color pixels may be counted over two or more lines or the entire original surface and the result may be compared with a certain threshold to make a judgment as to whether an autocolor process or a monochrome process is selected.

Clocks may be partially omitted and inputted to the counter 1101, whereby pixels may be sampled at intervals of, for example, two or four pixels instead of judging all the pixels.

[Main Scan Operation]

The following is an explanation of a main scan operation.

[Mixing Circuit]

The mixing circuit 112 is, as described previously, a circuit for appropriately weighting and outputting the signal obtained from the UCR/masking of the Y, M, C, Bk signals and the M signal which is an ND signal. The reason why the M signal is selected as the ND signal is that the M signal is the closest to an ND image of the Y, M and C signals.

If it is judged from an original judgment scan that an original of interest is a monochrome original, GAIN2 is set to "1", while GAIN1 is set to "0", that is to say, the mixing circuit 112 outputs the M signal only.

If it is judged that the original is a color original, GAIN1 and GAIN2 are switched according to each individual pixel.

FIGS. 12A to 12D show the respective character edge judgment signals of color judgment signals relating to the characters "A" which have been read out in different states of color. FIGS. 12A to 12C show the color judgment signals corresponding to a section a of the character "A" shown in FIG. 12D.

FIG. 12A shows an example in which the black character "A" is read in black, and a signal M2 indicating an achromatic density signal (hereinafter referred to as an "ND signal") is read in rounded form compared to the waveform shown in FIG. 12D due to various aberrations involved in a readout optical system. An edge signal EDGE is formed in such a manner that the edges of the section a of the character are "swollen", and only the signal BL1 is generated as a color judgment signal.

A color separation signal for green is employed for the signal EDGE and the signal M2 which indicates the ND signal. Accordingly, any character other than a green character provides an output similar to that of FIG. 12A, even in the case of the characters shown in FIGS. 12B and 12C. Neither of the signals M2 and EDGE is generated with respect to the green character.

FIG. 12B shows an example in which the character "A" consisting of an intermediate saturation character is read out, and the signal UNK1 indicating an intermediate saturation is generated.

FIG. 12C shows an example in which the character "A" consisting of a black character is read with color deviation. The signal BL1 is thin compared to that of FIG. 12A, and the intermediate saturation signal UNK1 is generated due to such color deviation in the vicinity of it.

Figure 13A:
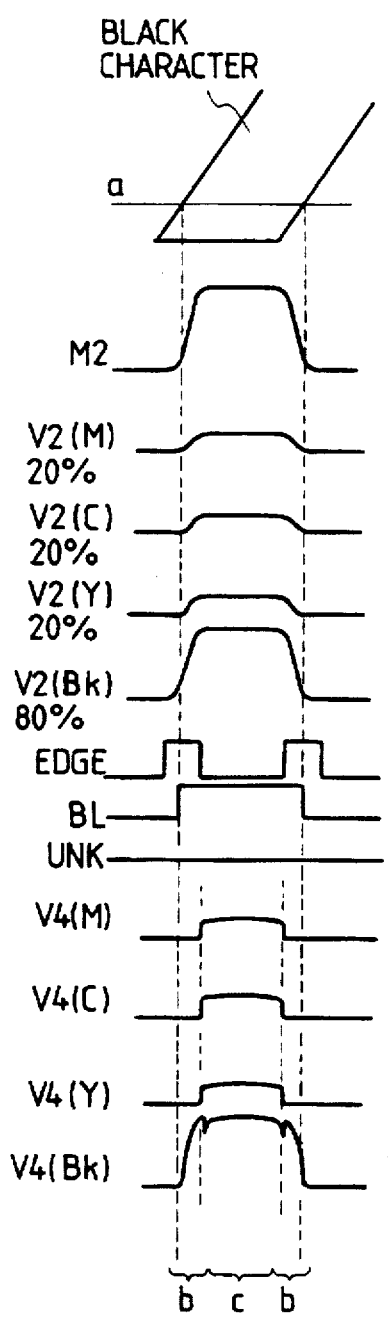
Figure 13B:
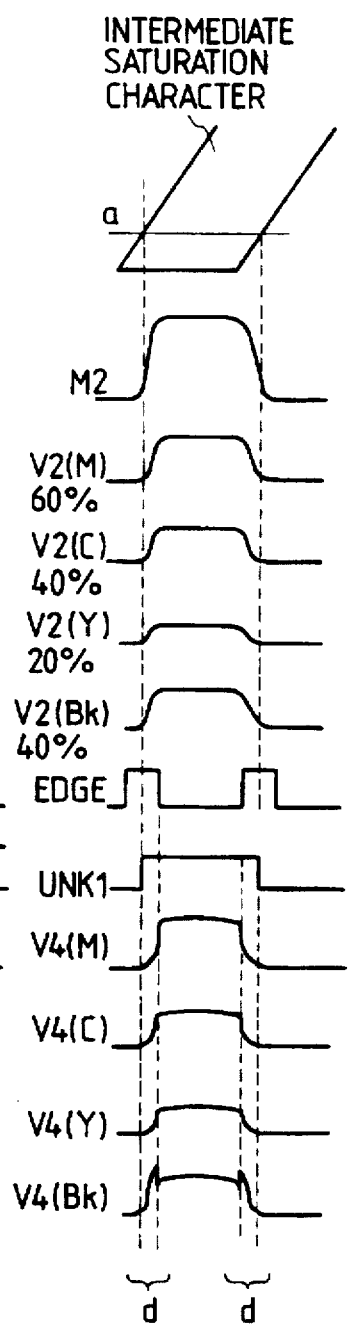
Figure 13C:
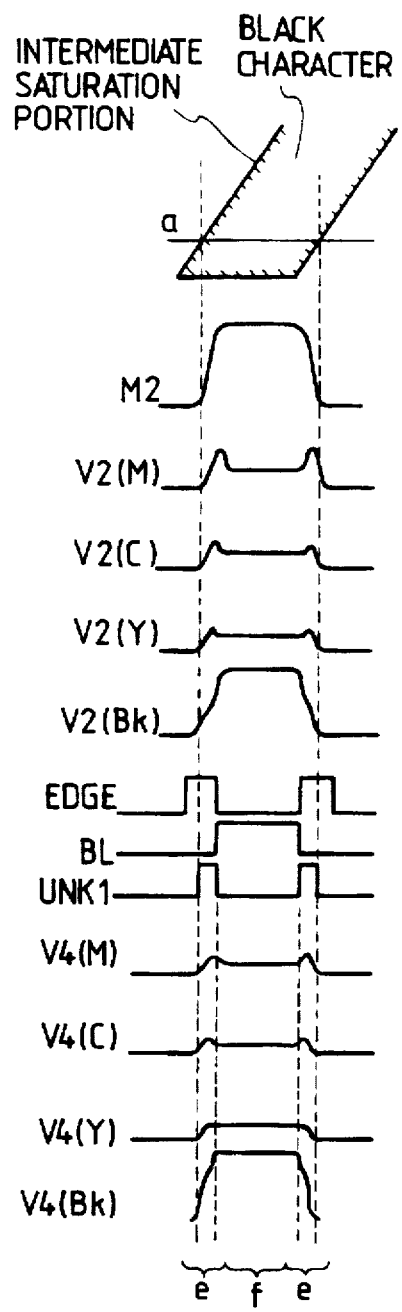

FIGS. 13A, 13B and 13C are enlarged views respectively showing the section a of the black character of FIG. 12A, that of the intermediate saturation character of FIG. 12B, and that of the black character of FIG. 12C having intermediate saturation edge portions. In FIGS. 13A to 13C, each signal V2 shows a signal example which is outputted from the circuit 107 when developing colors are M, C, Y and Bk.

FIG. 13A shows a case where a black character is read out, and the color components of M, C and Y are each reduced to about 20% owing to the UCR effected by the circuit 107. However, it is more desirable that the black character be recorded by using black toner. To suppress an intermediate saturation portion which may occur along the edge of the black character as shown in FIG. 12C, it is desirable that the color components of M, C and Y be minimized.

For these reasons, in the above-described embodiment, the ND signal M2 and the color recording signal V2 (M', C', Y', K') supplied from the UCR and masking circuit 107 are appropriately mixed with each other in accordance with the results of the color judgment signals and the character edge judgment signal, as shown in FIG. 14.

Part (a) of FIG. 14 corresponds to the edge signal EDGE of the black character shown in FIG. 12A, and if M, C and Y are developing colors, a "0" signal (not developed) is outputted, while if Bk is a developing color, the density signal M2 is outputted if Bk is a developing color. Part (b) of FIG. 14 corresponds to the intermediate saturation edge portion shown in FIG. 12B. In this case, in order to emphasize the black component of the edge portion, if M, C and Y are developing colors, half of each of the M', C' and Y' which are generated by the UCR and masking circuit 107 is outputted as the color recording signal V2. If Bk is a developing color, a signal is outputted in which the output K' of the color recording signal V2 is added to the density signal M2 at a ratio of 50% to 50%.

Part (f) of FIG. 14 corresponds to the non-edge portion of the black character shown in FIG. 12A. In order to smoothen the linkage between the signals of the edge portion recorded in a Bk color only and those of the edge portion, the M', C' and Y' components of the color recording signal V2 are each reduced to three fourths, and three fourths of the K' component obtained in Bk recording are added to one fourth of the density signal M2.

Part (e) of FIG. 14 corresponds to an edge portion having color, and M, Y, C and Bk and the color recording signal V2 are directly employed.

Part (h) of FIG. 14 corresponds to a pixel which constitutes neither an edge portion nor black, and as in the case of Part (e), the color recording signal V2 is employed.

The variation of each image signal which is derived from the arithmetic operations shown in FIG. 14 will now be described with reference to FIGS. 13A to 13C. In the following description, V2(M) means a V2 output provided when PHASE=0 (magenta developing color). Similarly, V2(C), V2(Y) and V2(Bk) mean V2 outputs corresponding to cyan, yellow and black, respectively.

FIG. 13A shows a part of a black character, and the portions denoted by b are edge portions corresponding to Part (a) of FIG. 14. The quantities of M, C and Y signals to be recorded are made zero, and the density signal M2 is outputted as a Bk signal.

A portion corresponding to C is a black non-edge portion corresponding to Part (f) of FIG. 14. V4 signals V4(M), V4(C), V4(Y) for the respective developing colors M, C and Y are three fourths of V2(M), V2(C) and V2(Y), respectively, and V4(Bk) takes on a value obtained by adding three fourths of V2(Bk) to one fourth of M2.

FIG. 13B shows an intermediate saturation character. Portions denoted by d are edge portions corresponding to Part (C) of FIG. 14. V4 signals V4(M), V4(C), V4(Y) are halves of V2(M), V2(C) and V2(Y), respectively, and V4(Bk) takes on a value obtained by adding half of V2(Bk) to half of M2.

FIG. 13C shows a case where an intermediate saturation portion occurs along the edge portion of a black character. Edge portions e are subjected to processing similar to that applied to portions d, and a non-edge portion is subjected to processing similar to that applied to a portion c on the basis of a judgment made in favor of black (BL=1). In this manner, color signals generated along the edge portion of the black character are reduced.

Part (h) of FIG. 14 shows a case where EDGE=BL1=0, and the value of the signal V4 is made equal to that of the signal V2 irrespective of the values of the signals UNK1 and COL1.

In the embodiment described above, to generate the signal V4 shown in FIG. 14, multipliers 112-1 and 112-2 and an adder 112-3 are employed as shown in FIG. 1. A multiplication coefficient generating part, which is disposed in the control signal generation unit 110, receives the color judgment signals BL1, UNK1, COL1 and a color judgment signal CAN1 as well as the character edge judgment signal EDGE to generate the multiplication factors α=GAIN1 and β=GAIN2 for the respective multipliers 112-1 and 112-2.

Figures 15, 16:
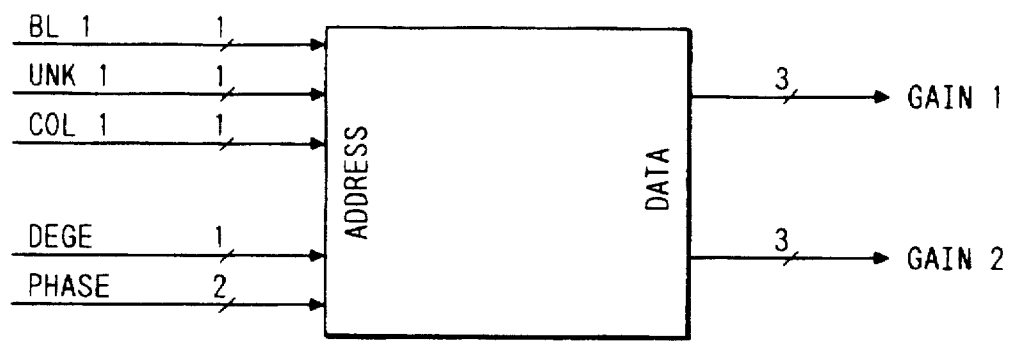
FIGS. 15 and 16 are a view showing a mixing circuit and a corresponding truth table.

The multiplication coefficient generating part, as shown in FIG. 15, consists of a ROM which receives a signal PHASE AND 5-bit judgment signals as an address and output two 3-bit gain signals GAIN1 and GAIN2.

Figure 17:
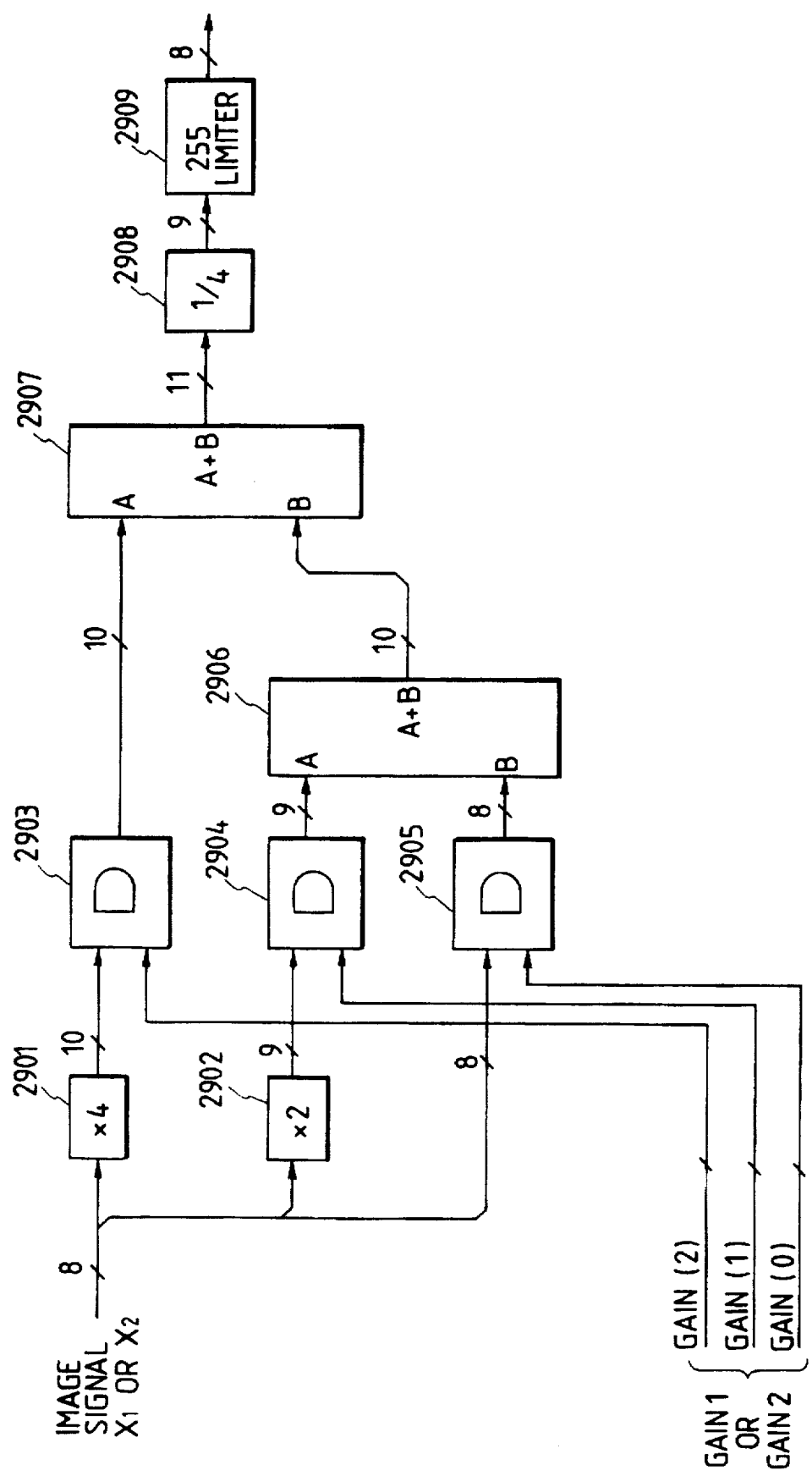
FIG. 17 is a circuit diagram showing a multiplier.

FIG. 16 shows the relationships between the address and output of the ROM. The gain signals GAIN1 and GAIN2 each correspond to four times an actual gain, and the multiplier 112-1 and 112-2 multiply the gain signals GAIN1 and GAIN2 by ¼, respectively. FIG. 17 shows the details of the multipliers 112-1 and 112-2. An 8-bit image signal is supplied to bit-shift multipliers 2901 and 2902 as well as a gate 2905. The 8-bit image signals supplied to the bit-shift multipliers 2901 and 2902 are respectively multiplied by 4 and 2 and are then supplied to corresponding gates 2903 and 2904. The signals thus supplied are selected by the gates 2903, 2904 and 2905 in accordance with 3-bit gain signals GAIN(2), GAIN(1) and GAIN(0), respectively. The results of the selection are added by adders 2906 and 2907. Subsequently, the output from the adder 2907 is multiplied by ¼ by a bit-shift divider 2908, and a 255 limiter 2909 rounds 9-bit data of not less than 255 to 255 8-bit data and outputs the 255 8-bit data.

In the manner described above, a color judgment signal and the color recording signal V2 and the density signal M2 which are weighted and added according to a character edge judgment signal are inputted to the spatial filter 117.

[Spatial Filter]

Figure 18:
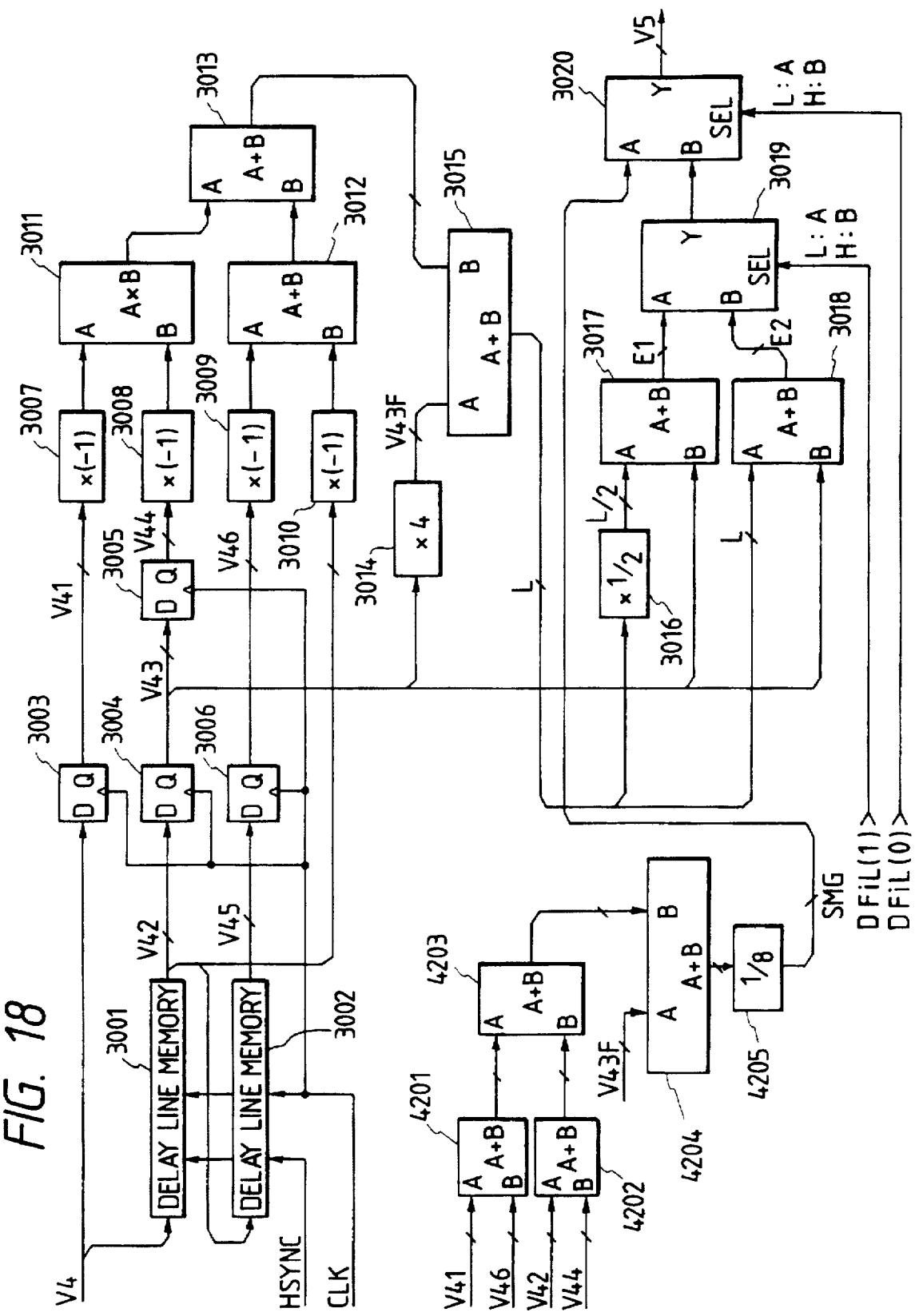
FIG. 18 is a circuit diagram showing a filter.

The construction of the spatial filter 117 used in the above-described embodiment is shown in FIG. 18. The spatial filter 117 shown in FIG. 18 is an edge emphasis filter which utilizes a Laplacian filter of 3×3 pixels and whose Laplacian multiplier is switchable between ½ and 1.

Line delay memories are denoted by 3001 and 3002, respectively. The image signals V4, V42 and V45 for three lines, which are generated by the line delay memories 3001 and 3002, are delayed by one clock in flip-flops 3003, 3004 and 3006, respectively. A signal V43 is assigned to an objective pixel, and signals V41, V42, V44 and V46 are multiplied by −1 by multipliers 3007 to 3010, respectively. The results are added through adders 3011, 3012 and 3013. The objective pixel V43 is also multiplied by 4 in a multiplier 3014, and the result is added to the output from the adder 3013 in an adder 3015, thereby generating a Laplacian L. The Laplacian L is multiplied by ½ in a multiplier 3016. In an adder 3017, the objective pixel V43 is added to L/2, whereby a low-level edge emphasis signal E1 is generated. An adder 3018 adds the objective pixel V43 to the Laplacian L, thereby generating a high-level edge emphasis signal E2. The two kinds of edge emphasis signals and the signal V43 representative of the objective pixel itself are selected in accordance with control signals DFiL (1) and DFiL(0), whereby a signal V5 is outputted. If the control signals DFiL(1) and DFiL(0) are "0" and "1", respectively, a selector 3019 selects the low-level edge emphasis signal E1, while If the control signals DFiL(1) and DFiL(0) are "1" and "1", respectively, the selector 3019 selects the high-level edge emphasis signal E2. If the control signal DFiL(0) is "0", a selector 3020 selects a smoothed signal SMG which will be described later and outputs it as the signal V5.

A two-bit DFiL signal which consists of the control signals or filter switching signals DFiL(1) and DFiL(0) is generated by the filter control signal generating unit shown in FIG. 19, which is provided in the control signal generation unit 110.

In the above-described embodiment, high-level edge emphasis is applied to the edge portion of a black character to sharply represent this black edge portion. However, such edge emphasis is not applied to the non-edge portion of the character to prevent the edge emphasis from changing the tone of the non-edge portion.

The edge portion of an intermediate saturation or color character is subjected to low-level edge emphasis so as to sharply record the edge portion and to prevent the variation of tone due to the edge emphasis from appearing to an extremely conspicuous extent. FIG. 19 shows the circuit of the filter control signal generating unit, and FIG. 20 shows corresponding logical expressions.

[Processing of Flat Portion]

An area which is not judged to be an edge portion in a character edge judgment unit 107 of the present embodiment, contains a half-tone original image (screen original image) as well. If the half-tone original image is read into a CCD in units of pixels, moire fringes will be formed by the regularity of the pixels of the CCD and the regularity of the half-tone oritinal image.

To prevent such moire fringes, in the above-described embodiment, an original area which is not judged to be a character edge, that is, an area which often contains a half-tone image (or screen image), is subjected to smoothing in the filter circuit 113. The filter circuit 113 utilizes a smoothing filter which is arranged to multiply the objective pixel by ½ and four neighboring pixels by ⅛ and to add the results together.

FIG. 18 shows the details of the filter circuit 113 used in the above-described embodiment.

Referring to FIG. 18, the four pixels V41, V42, V44 and V46 which neighbor the objective pixel are added together through adders 4201, 4202 and 4203. In an adder 4204, the result is added to a signal V43F which is obtained by multiplying the objective pixel V43 by four.

The result is multiplied by ⅛ in a bit-shift type divider 4205 to provide a smoothed filter signal SMG.

Since the objective pixel is delayed by one line and one clock in the filter circuit 113, a signal FiL outputted from a filter control signal generating unit 109 is delayed by one line and one clock in a line memory 121. Thus, a signal DFiL is produced. Similarly, a signal GAM outputted from a gamma switching signal generating unit 110 and a signal SCR outputted from a screen switching signal generating unit 111 are delayed by one line and one clock, to form signals DGAM and DSCR.

[Gamma Conversion Unit]

Figure 22:
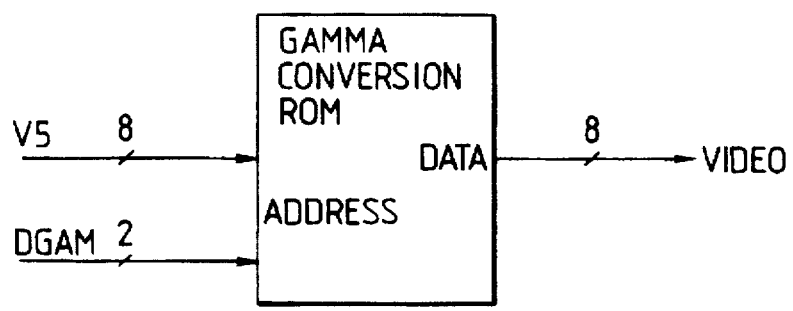
FIGS. 22 to 25 are views showing gamma conversion.

The gamma conversion unit, or density correction circuit, 114 converts the density of an image. The gamma conversion unit 114 consists of a ROM as shown in FIG. 22, and receives a filtered 8-bit signal V5 as an ROM address input and provides a corresponding gamma conversion output at a ROM data terminal as an 8-bit signal VIDEO.

Figure 23:
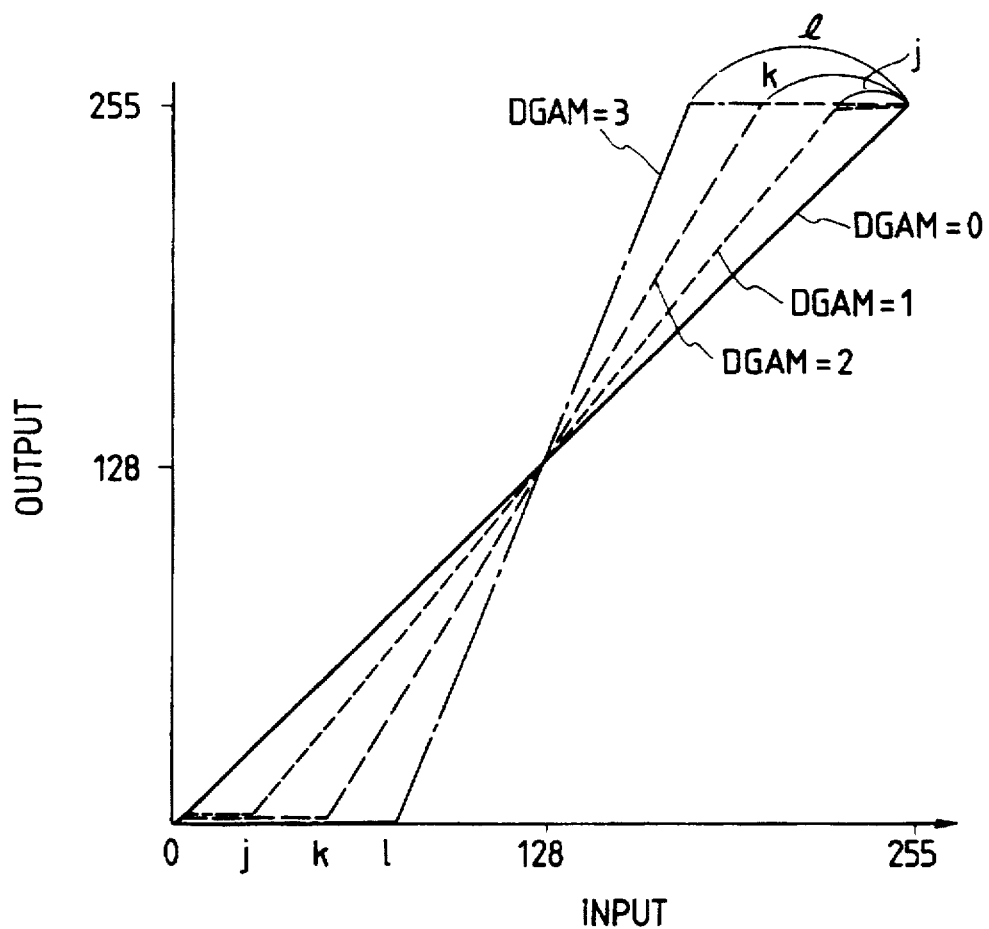

As shown in FIG. 23, four kinds of gamma characteristics can be selected in accordance with a 2-bit signal DGAM which is inputted to an address line.

In FIG. 23, a line DGAM=0 means that an input is equal to an output, and is applied to the non-edge portion of a character. A line DGAM=1 means that, in response to inputs 0 to 255, outputs "0" are generated for an interval j on the side of "0", while outputs "255" are generated for an interval j on the side of "255". A conversion characteristic depicted by a straight line having an inclination of $$\frac{255}{255-2j}$$

is applied to the interval between both intervals j. This conversion characteristic indicates that: with respect to low-density inputs neighboring "0", lower-density video signals are outputted; with respect to high-density inputs neighboring "255", high-density video signals are outputted; and the variation of the density of intermediate-density inputs neighboring "128" is emphasized. Accordingly, it is possible to sharply record a character edge. The line DGAM=1 is applied to a color character edge.

A line DGAM=2 has k which is greater than the value of j of the line DGAM=1, whereby a character edge is more sharply recorded. However, since the linearity between input and output is impaired to some extent, tone quality is not insured. For this reason, the line DGAM=2 is applied to an intermediate saturation character edge only.

A line DGAM=3 has 1 which is greater than the value of k, and is applied to a black character edge which requires more sharpness.

Figures 24, 25:
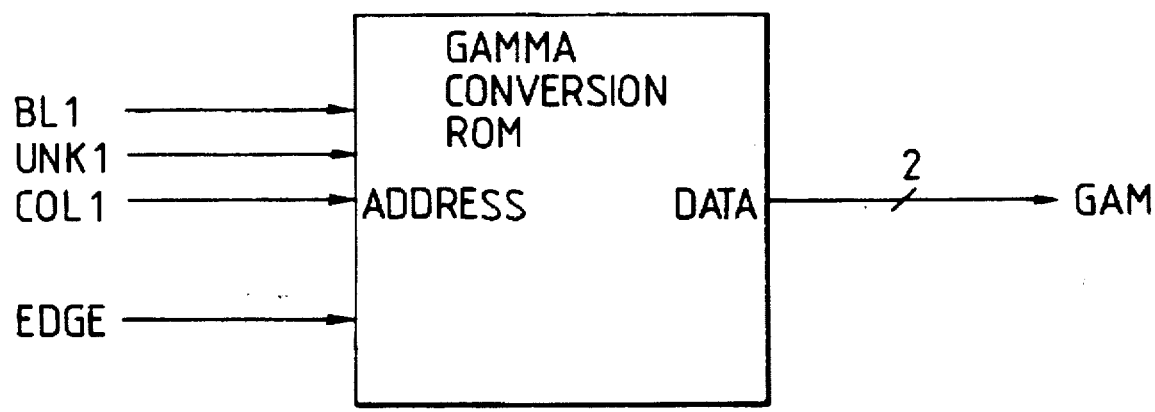

The gamma switching signal DGAM is, as described above, obtained by delaying the signal GAM outputted from the gamma switching signal generating unit 110 by one line and one clock by means of the line delay 121. The gamma switching signal generating unit provided in the control signal generating unit 110 consists of a ROM, as shown in FIG. 24, and receives a color judgment signal and a character edge judgment signal as an address and outputs the signal GAM as data. The contents of the table of the ROM are as shown in FIG. 25. As described above, in the case of a black character edge portion (EDGE=1, BL1=1), the data GAM is set to "3", while, in the case of an intermediate saturation character edge portion (EDGE=1, UNK=1), the data GAM is set to "2".

[Pulse Width Modulation Unit]

The video signal thus gamma-converted is converted into a pulse width signal by a pulse width modulation (PWM) unit 115.

The lighting period of the laser 213 is controlled in accordance with the pulse-width-modulated signal, thereby providing the copy output 116 corresponding to a gray-level representation.

Figure 26:
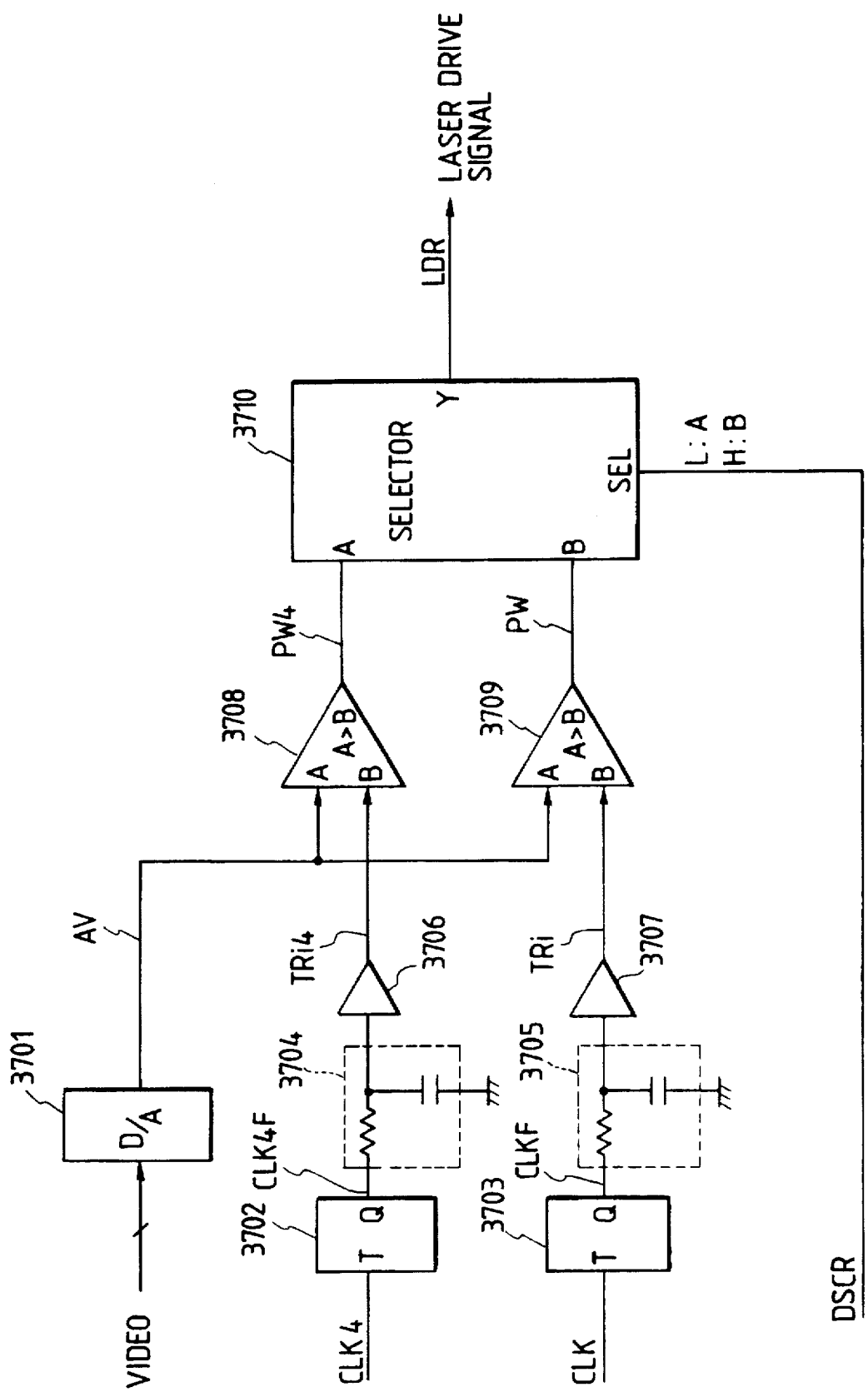

FIG. 26 shows in detail the circuit of the PWM unit.

The video signal is converted into an analog image signal AV in a D/A converter 3701. The image signal CLK, which is synchronized with the video signal, and the screen clock signal CLK4 having a frequency twice that of the image signal CLK are respectively divided by two in toggle flip-flops 3702 and 3703 in synchronization with the signal HSYNC. Thus, the signal CLK4 and the signal CLK are converted into clocks CLK4F and CLKF each having a 50% duty. These two clocks are transformed into triangular waves by corresponding integrators 3704 and 3705 and the peaks of the respective triangular waves are adjusted to the output dynamic range of the A/D converter by corresponding amplifiers 3706 and 3707. The output of each of the amplifiers 3706 and 3707 is compared with a signal AV in each analog comparator 3708 and 3709.

In this manner, the AV signal is converted into two pulse-width-modulated signals PW4 and PW. A selector 3710 selects the signal PW4 or PW in accordance with the signal DSCR and outputs a laser drive signal LDR.

Figure 27:
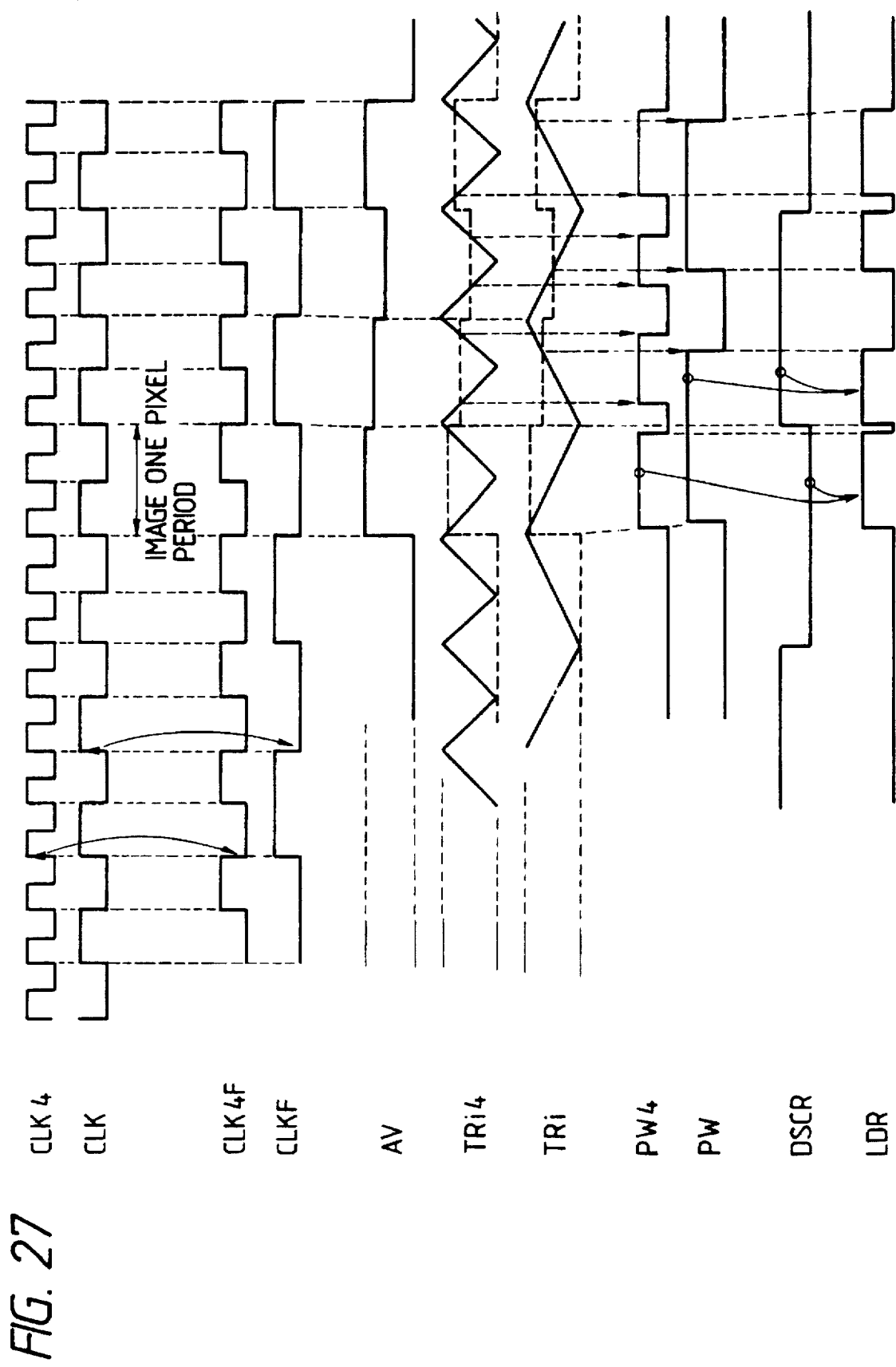

FIG. 27 shows the operational timing of the circuit. As illustrated, a triangular wave TRi4, which is obtained by integrating the clock signal CLK4F obtained by dividing the clock signal CLK4 by two, is a triangular wave of image one pixel period. The triangular wave approximately linearly varies over the entire output range of the D/A converter. Accordingly, on the basis of a comparison between the triangular wave and the analog image signal AV, the signal AV is pulse-width-modulated to form the signal PW4 whose one period corresponds to an image pixel period.

Similarly, a triangular wave TRi is made from the clock CLKF obtained by dividing the pixel clock CLK by two. Accordingly, the signal AV is pulse-width-modulated to form the signal PW whose one period corresponds to an image=pixel period.

The PW4 signal which has been pulse-width-modulated with one pixel period is used to effect image recording at a printer at a resolution which is the same as that of the clock signal CLK. However, if image recording is performed with the signal PW4, a satisfactory gray-level representation will not be obtained because of the characteristic of the electrostatic photography used in the printer since the basic unit of density is as small as one pixel.

In contrast, since the signal PW represents density in units of two pixels, a satisfactory gray-level representation is obtained but an obtainable recording resolution is half that attained with the signal PW4.

For this reason, in the above-described embodiment, the signals PW and PW4 are switched for each pixel by controlling the signal DSCR in accordance with the kind of image. Specifically, the signal PW4 is used in processing the edge portions of a black character and an intermediate saturation character which require a high degree of resolution. In contrast, the signal PW is used in processing the edge portion of a color character and a non-edge portion in which tone is an important factor. However, it has been experimentally confirmed that it is preferable to use the signal PW4 in favor of resolution in processing a color character edge on an original which includes thin color characters, such as a map. Accordingly, an arrangement may be incorporated in which the signal PW4 can be selected by a manual operation in processing an image such as a map.

The signal DSCR for switching the signals PW and PW4 is obtained by delaying the signal SCR from the screen switching signal generating unit of the control signal generating unit 110 by one line and one clock in the line delay 121. The details of the screen switching signal generating unit are shown in FIG. 28.

The provision of the screen switching signal generating unit allows the signal DSCR of FIG. 27 to be held at a low level over a period which corresponds to a portion which requires black toner development and which is contained in the edge portion of a black or intermediate saturation character. The signal PW4 is outputted as the laser drive signal LDR for such a period only. If it is judged that a character edge portion has been detected but the character edge portion is accompanied by color deviation (CAN1=1), the signal PW4 is not employed to prevent the quality of a recorded image from deteriorating due to an emphasized color deviation.

In other words, while the edge of a black character requires sharpness, the edge of a color character requires tone reproduction.

As shown in FIG. 13A, no M, C and Y toner is present in the edge portion of a black character, and little Bk toner is present in a color character by the operation of the UCR circuit 105. In the edge portion of an intermediate saturation character, an appropriate amount of Bk, M, C, and Y toner is present as shown in FIG. 13B.

In the above-described embodiment, the character edge judgment unit makes it possible to selectively use the pulse-width-modulated signal PW4 of one pixel period for laser driving purposes in only a reproducing operation with Bk toner.

With this arrangement, a black character edge which does not contain a substantial amount of color component can be sharply reproduced. In addition, a color character edge which contains a small amount of color component can be recorded in such a manner that only its Bk component is sharply recorded with the gray-level reproducibility of its color components retained. Accordingly, the color reproducibility of the color character edge can also be assured.

[Parameters for Original Judgment and Parameters for Main Scan]

During each of an original judgment scan and a main scan, the color judgment unit 109 makes a judgment as to whether each pixel in the original is chromatic or achromatic. Judgment parameters for the original judgment scan differ from those for the main scan, and each of the parameters for these scans is set to an appropriate value in Steps 902 and 905 of FIG. 10.

The following is an explanation of the optimum values of the respective parameters for each scan.

In FIG. 29A, a monochrome original is denoted by reference numeral 1201, and FIG. 29B shows the levels of the respective R, G and B signals appearing along a main scan line which contains a point C on an edge portion of the illustrated character.

Ideally, it is desirable that the levels of the R, G and B signals be completely equal. However, as shown in FIG. 29B, a slight color deviation between MAX (R, G, B) and MIN (R, G, B) occurs at the point C of the edge portion.

Figure 30A:
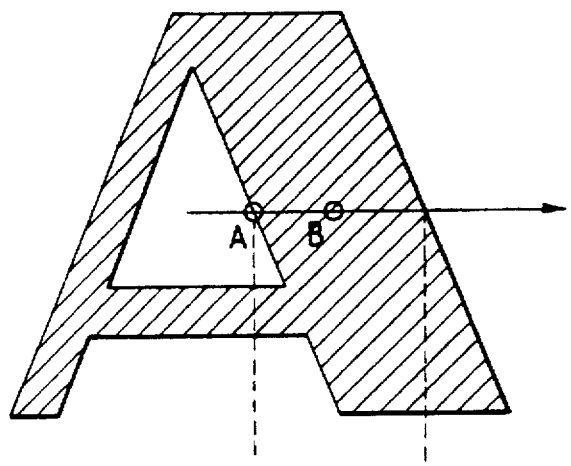
Figure 30B:
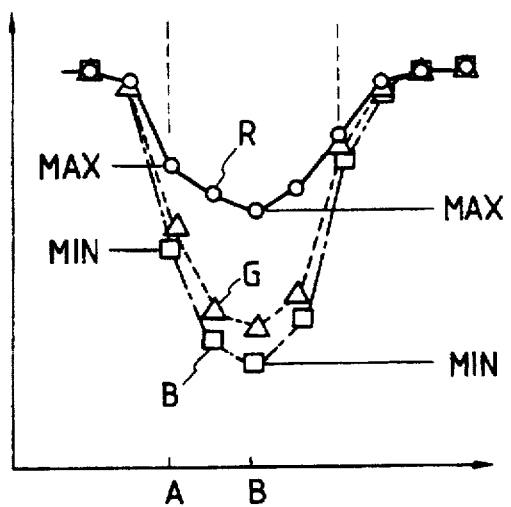

FIG. 30A is a view similar to FIG. 29A, but shows a color original. FIG. 30B shows the levels of the respective R, G and B signals appearing along a main scan line which contains a point A on an edge portion of a red character and a point B in the flat portion of the same.

As shown in FIG. 30B, the difference between MAX (R, G, B) and MIN (R, G, B) at the point A tends to be slightly greater than the above-described difference at the point C.

At the point B, the difference between MAX (R, G, B) and MIN (R, G, B) is quite large.

Figure 31:
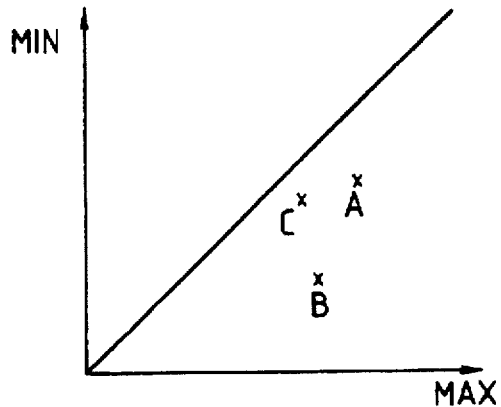
FIG. 31 and FIGS. 32A and 32B are views showing judgment conditions.

FIG. 31 shows a graphic representation in which the values of MAX (R, G, B) and MIN (R, G, B) at each of the points A, B and C are plotted in the MAX-MIN plane shown in FIG. 7-1.

In the case of a main scan, since a judgment as to each pixel is of importance, the points A and B, that is, a color character portion, needs to be correctly distinguished from the point C, that is, a black character portion.

In the case of an original judgment scan for discriminating between a color original and a monochrome original, a judgment as to whether an original of interest is a color original or a monochrome original is of importance. Accordingly, even if the point A is mistakenly judged to have an achromatic color, there is no problem as long as it is possible to correctly judge the point B and the point C as a chromatic color and an achromatic color, respectively.

It suffices that the point C can be correctly judged as a black pixel in the main scan and that the point B can be correctly judged as a chromatic pixel in the prescan or original judgment scan.

Figure 32A:
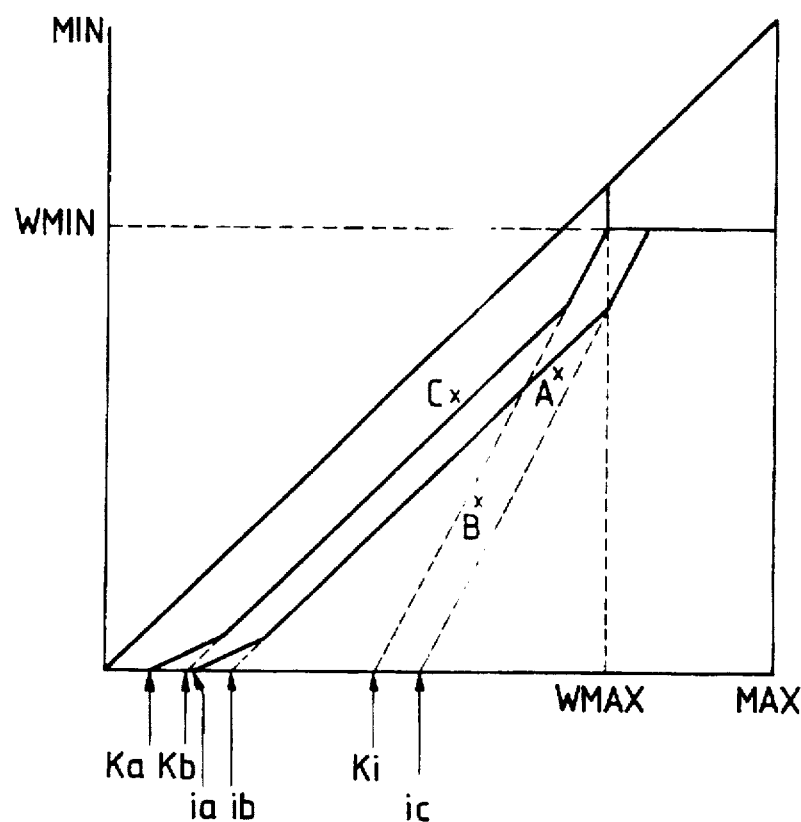
Figure 32B:
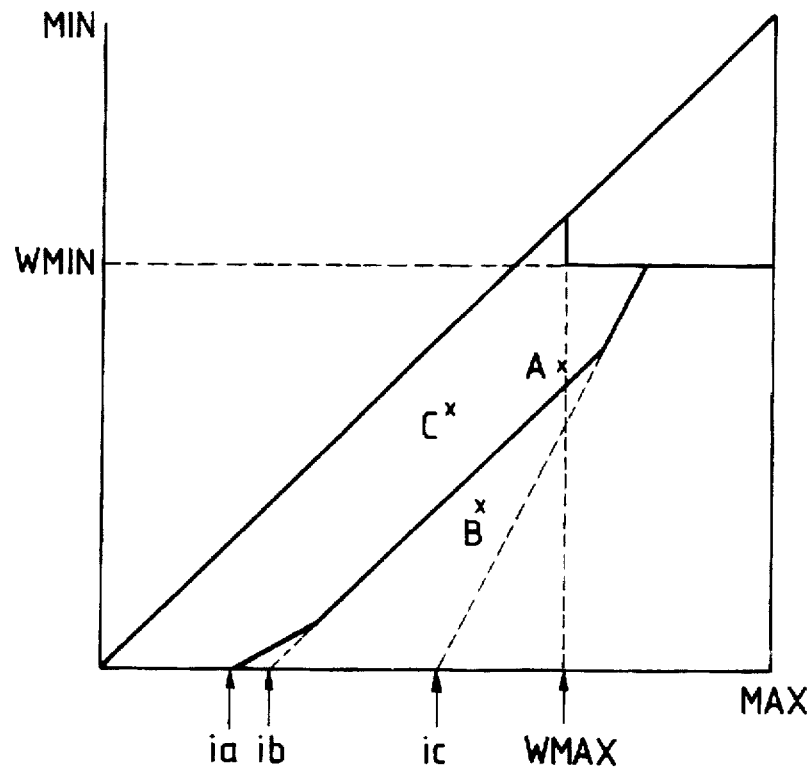

FIGS. 32A and 32B show references for making judgments as to optimum saturation for the main scan and the original judgment scan, respectively.

In the case of the main scan or black-character judgment scan, as shown in FIG. 32A, the values of the parameters ia, ib, ic, ka, kb, and kc are adequately determined so that the points A and B are each judged as a chromatic pixel, while the point C is judged as a black pixel.

The values of the respective parameters ia, ib, ic, ka, kb, and kc are set while making much account of the values of ka, kb, kc on the saturation judgment table of FIG. 7-1.

In the case of the original judgment scan, as shown in FIG. 32B, if only the point B can be correctly judged to be a chromatic pixel, the number of chromatic color pixels can be counted by the counting means 117 to make a judgment as to whether the original is a monochrome original or a color original. Accordingly, it does not matter whether the point A is judged as an achromatic color pixel. The reference shown in FIG. 32B is set while making much account of the values of ia, ib, ic in order to reliably judge the chromatic color pixel area C shown in FIG. 7-1. The values of ka, kb and kc may take on any value within the following range:

$0 \leq ka \leq ia$ $0 \leq kb \leq ib$ $0 \leq kc \leq ic$

For example, as shown in FIG. 7-1B, an intermediate pixel area may be eliminated by setting ka, kb and kc to ka=ia, kb=ib and kc=ic, respectively. Otherwise, a black pixel are may be eliminated by setting ka, kb and kc to ka=kb=kc=0.

As described above, in the original judgment scan, as shown in FIG. 32B, the values of ia, ib and ic are made greater than those of ia, ib and ic shown in FIG. 32A (in the main scan), whereby the probability of an erroneous judgment can be reduced.

In the above-described judgment according to the present invention, a judgment as to whether an original of interest is a monochrome original or a color original as well as the detection of a black character portion in the original can be implemented by means of an identical hardware arrangement but under different judgment conditions which match individual judgments, whereby processing free from an erroneous judgment can be achieved. In addition, since a common hardware arrangement is utilized to effect processing based on the different judgment conditions, it is possible to realize a high-performence apparatus having an efficient arrangement.

Although the aforesaid embodiment have been described with reference to a digital color laser copying machine arranged to produce a printout with toner, the present invention can be applied to a color image forming apparatus such as a color thermal transfer printer, a color ink-jet printer and the like.

In the aforesaid embodiment, the color judgment unit 109 and the chromatic color pixel counting means 117 makes a judgment as to whether an input image is a monochrome image or a color image on the basis of input image signals R, G and B, while the color judgment unit 109 makes a judgment as to a black character on the basis of input image signals R, G and B. The CPU 118 switches parameters for saturation judgment references between a black character judgment (main scan) and a judgment as to whether an original is a monochrome original or a color original.

Accordingly, the individual parameters can be optimized so that a black pixel detection reference for each of the prescan and the main scan can be changed to minimize the probability of erroneous judgment.

In addition, not only the parameters but algorithms for a black pixel judgment can be switched for each of the prescan and the main scan.

[Second Embodiment]

Figure 33:
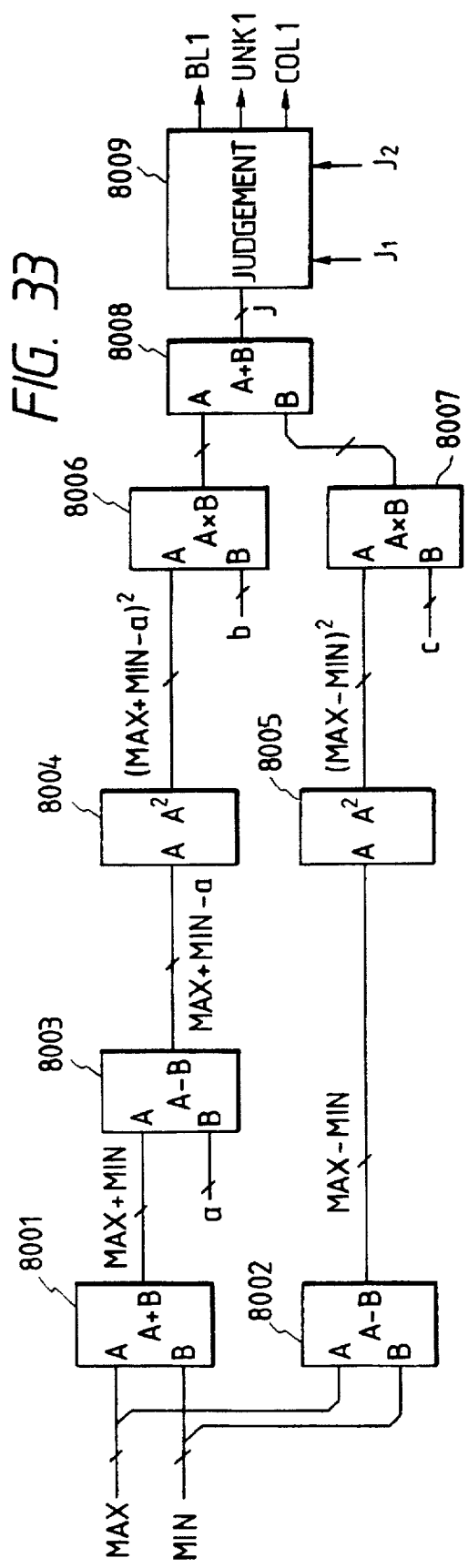
FIG. 33 and 34 are explanatory views of a second embodiment of the present invention.
Figure 34:
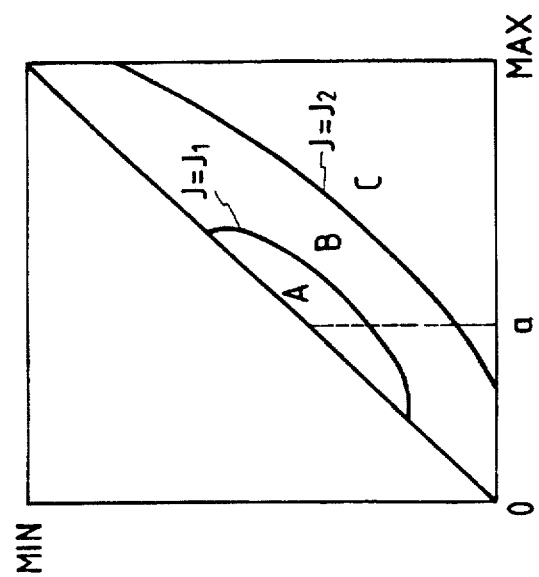

FIGS. 33 and 34 show a second embodiment of the present invention.

FIG. 33 is a block diagram showing a saturation judgment. In the drawing, signals MAX and MIN correspond to those explained in connection with FIG. 1, and a judgment signal J is formed by passing the signals MAX and MIN through an adder 8001, subtractors 8002 and 8003, squaring devices 8004 and 8005, a multiplier 8006 and 8007 and an adder 8008. J is calculated by the following equation in accordance with the values of a, b and c which are previously set in the elements 8003, 8006 and 8007, respectively:

$$J = (MAX + MIN - a)^2 \times b + (MAX - MIN)^2 \times c$$

By appropriately selecting the values of a, b and c, a curve J=J1 and a curve J=J2, which are derived from an appropriate constant J1<J2, assume elliptical curves such as those shown in FIG. 34. Accordingly, a judgment circuit 8009 can be made to compare the value of J with J1 and J2, whereby a judgment similar to that shown in FIG. 7-1 can be made.

In accordance with the second embodiment, since an elliptical curve is used to implement area division, flexible area division can be implemented compared to area division using a straight line.

Although in the second embodiment an elliptical curve is used to implement area division, such an area division may be achieved by using any type of linear or non-linear equation such as a hyperbola or a parabola.

[Third Embodiment]

Figure 35:
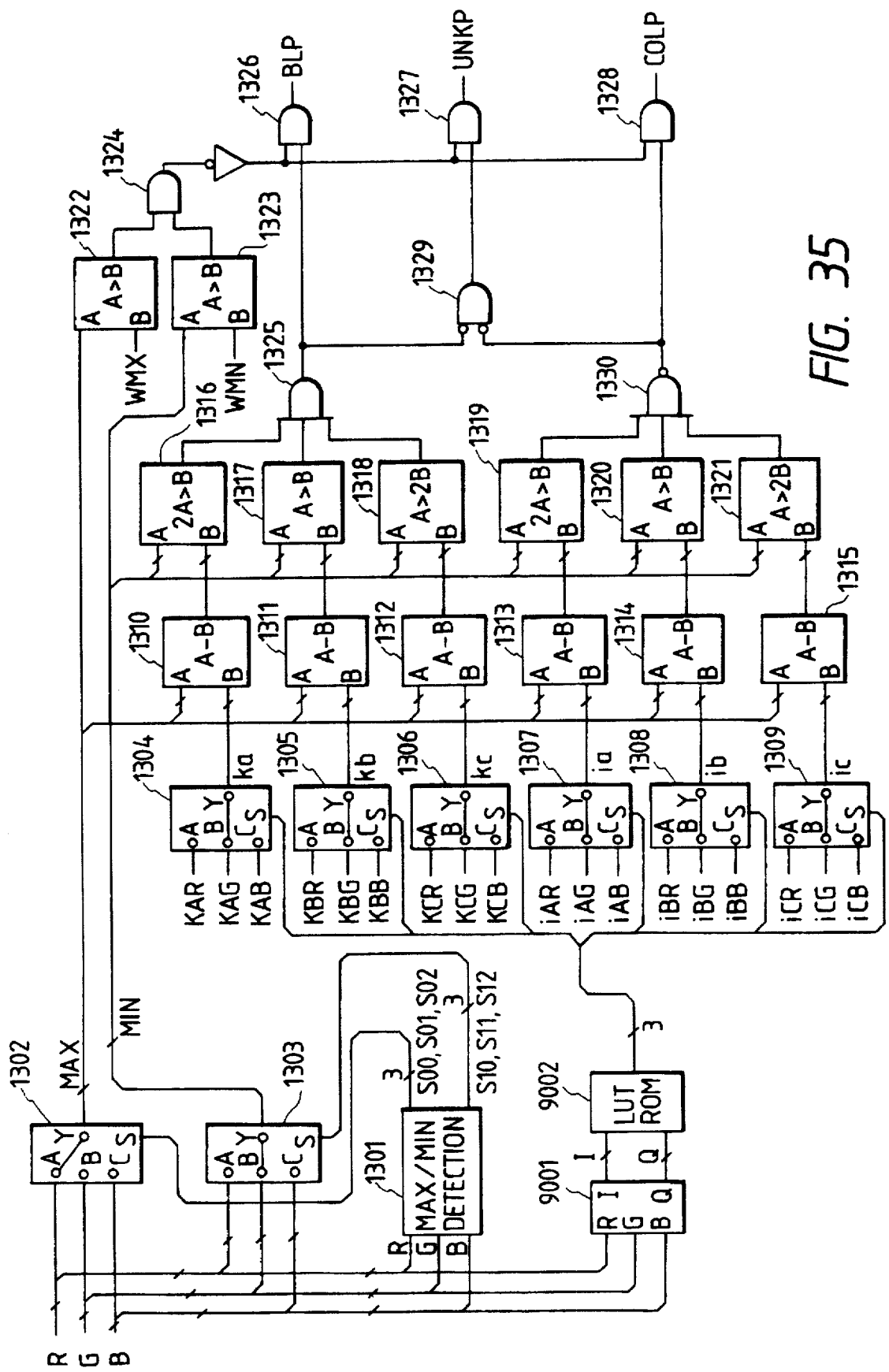
FIG. 35 is an explanatory view of a third embodiment of the present invention.

FIG. 35 shows a third embodiment of the present invention, and is a block diagram which illustrates the processing of saturation judgment.

An arithmetic device 9001 calculates (I, Q) of an space (Y, I, Q) from (R, G, B) by using the following equations:

$$\begin{cases} I = 0.60R - 0.28G - 0.32B \\ Q = 0.21R - 0.52G + 0.31B \end{cases}$$

A color hue can be judged on the basis of (I, Q). Accordingly, if the judgment result is programmed in a ROM 9002, a switching signal can be outputted from the ROM 9002 to the selectors 1304 to 1309.

Although the third embodiment employs (I, Q), a signal representing (a*, b*) of a space (L*, a*, b*) or another chromaticity may be employed.

Each selector may be switched not only in three steps but in six or twelve steps on the basis of each color hue.

In addition, the signal MAX or a combination of the signals MAX and MIN may be employed as selector signals.

[Fourth Embodiment]

Figure 36:
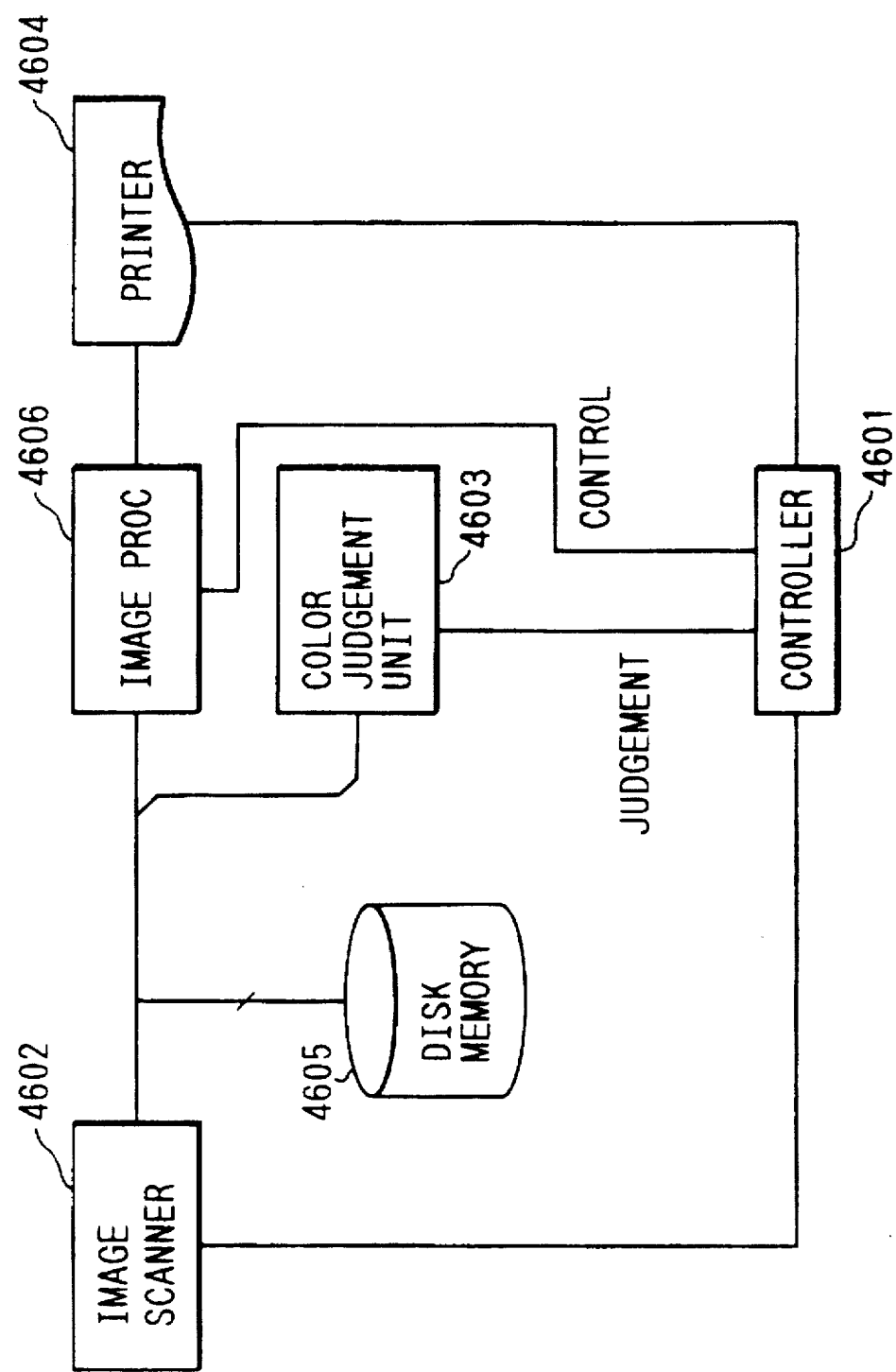
FIG. 36 is an explanatory view of a fourth embodiment of the present invention.

In addition, the range of application of the present invention is not limited to a copying machine, and the present invention is also effective in a file system such as that shown in FIG. 36.

The illustrated system comprises a controller 4601, an image scanner 4601 similar to the image scanner assembly 201, a printer 4601 similar to the printer assembly 202, a color judgment unit 4603 similar to the color judgment unit 109, a DISK memory 4605, and an image processing unit 4606 similar to the signal processing unit 211.

In the illustrated system, image data is communicated over any one of the following paths:

(1) Image scanner→DISK memory (2) image scanner→printer (3) DISK memory→printer

If the paths (1) and (2) are selected, the output modes of the printer are switched on the basis of a judgement as to the kind of original which is made by the original judgment scan. By writing monochrome or full color data into the DISK memory, the throughput of a monochrome print can be improved as in the case of the first embodiment. Further, the memory capacity of the DISK memory can be saved and the memory capacity can be efficiently utilized in filing a full color image and a monochrome image.

Further, if the paths (2) and (3) are selected, each pixel is outputted into the printer through a different processing, as in the case of the first embodiment, whereby a sharp output image without color deviation can be obtained.

As described above, in the above-described embodiment, a judgment as to whether an original is a monochrome original or a color original as well as the detection of a black character portion in each pixel in the original can be implemented by means of an identical hardware arrangement but under different judgment conditions which match individual judgments, whereby an improvement in throughput and an output free from color deviation can be realized. It is also possible to provide an apparatus having a common hardware arrangement and high performance.

[Fifth Embodiment]

A fifth embodiment of the present invention which will be explained below is arranged to allow a reference as to a chromatic/achromatic judgment to be changed through an operating unit. In this arrangement, it is possible to change such a judgment reference into a suitable judgment reference in accordance with the difference between the line sensors used in individual reader devices or the preference or purpose of use of each operator.

[Explanation of Operating Unit]

Figure 37:
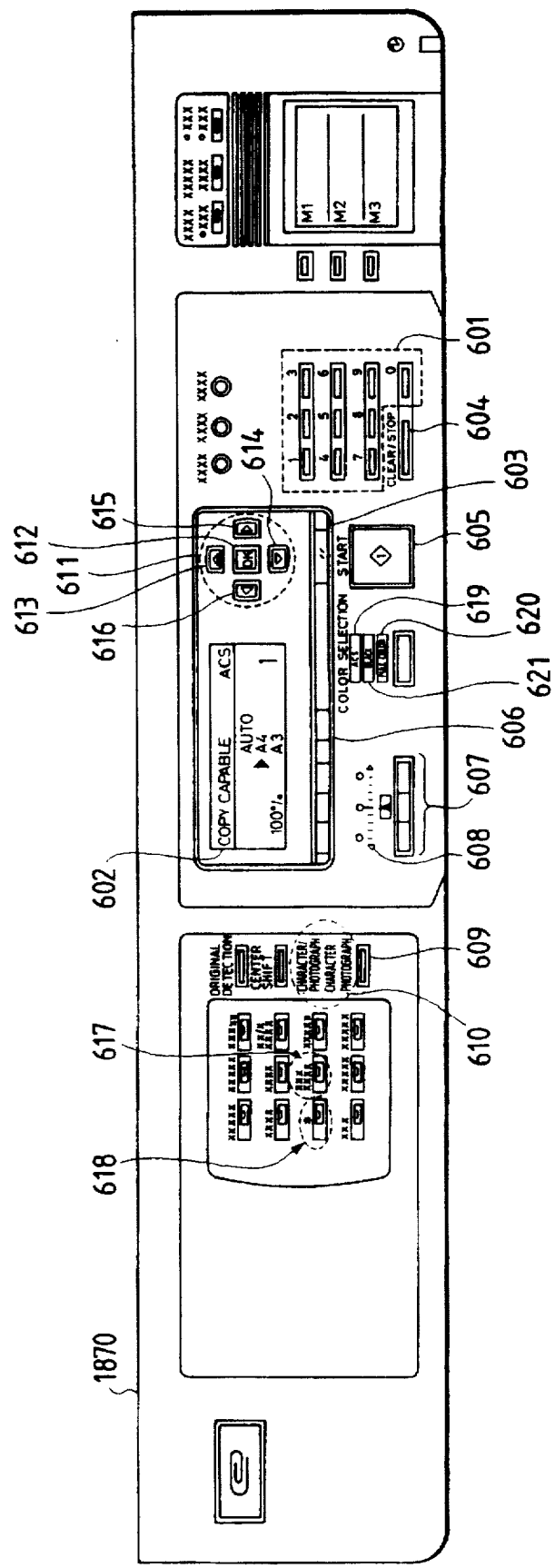
FIG. 37 is a view showing the external appearance of an operating unit of a fifth embodiment of the present invention.

FIG. 37 shows the external appearance of an operating unit 1870 according to the fifth embodiment.

An element 601 is a ten-key pad for use in inputting numbers "0" to "9", for example, to specify the desired number of copies.

An element 602 is a liquid-crystal display panel for providing a display which informs an operator of information such as the current setting mode of the copying machine, sheet size and copy magnification.

An element 603 is a reset key for use in initializing the current set mode. The reset key 603 is used, for example, when the desired setting has not been effected due to an erroneous operation.

An element 604 is a stop/clear key for use in stopping the operation of the machine which is operating and in clearing, when the machine is inoperative, the number of copies such as a number which is set through the ten-key pad 601.

An element 605 is a copy start key for use in starting a copy operation. When the copy start key 605 is depressed, the flow of FIG. 10 for initiating a prescan is started.

An element 606 is used to select the size of a sheet, and the selected sheet size (for example, A4) is displayed on the display panel 602.

An element 607 is a density key for use in increasing and decreasing the density of a copy. An element 608 includes nine light-emitting devices for displaying the current density level.

An element 609 is a selection key for use in selecting from modes representative of the kinds of originals, and is used to select from a character mode, a photograph mode and a character/photograph mode according to the kind of original.

Three elements shown in a dashed circle 610 indicate a character mode, a photograph mode and a character/photograph mode, respectively, and only one of the three elements is normally lit.

A control-key pad 611 includes an OK key 612, an upward arrow ($\Delta$) key 613, a downward arrow ($\nabla$) key 614, a rightward arrow ($\triangleright$) key 615 and a leftward arrow ($\triangleleft$) key 616. The control-key pad 611 is used to shift a cursor on the display panel 602, thereby setting the desired mode.

An element 617 is an image create key for use in processing and outputting an image or in adjusting a variety of image processing conditions.

An element 618 is an asterisk key for use in determining a magnification in accordance with the size of a sheet or in registering the desired copy mode as will be explained later.

An element 619 is an ACS key (or automatic monochrome/color recognition key) which is used to select a mode for making the aforesaid original judgment. When an electrical power is turned on, a mode for making an original judgment is selected as a default setup.

An element 620 is a black key for use in selecting a mode in which an original image is forcedly recorded in black only irrespective of whether the original is a monochrome original or a color original.

An element 621 is a full color key for use in selecting a mode in which an original image is recorded by using recording agents for four colors Y, M, C and Bk.

[Change in Saturation Judgment Reference for Original Judgment Scan (Prescan)]

As is known, an identical original may be judged in some case as a monochrome original or in another case as a color original due to variations in the various characteristics of the reader system incorporated in an apparatus. This is because the distribution of chromatic and achromatic colors in the MAX-MIN plane shown in FIG. 7-1 changes due to variations in various characteristics such as the spectral sensitivity characteristics, resolution and vibration conditions of the reader system.

An identical original may also be copied in black only or full colors in accordance with the desire or purpose of use of an operator. For example, the purpose of use of each operator may determine whether an original such as a newspaper having a yellowish background should be copied in black with the background yellow extinguished or the newspaper should be faithfully copied in full colors including the background color.

To cope with the above-described problem, the operator may change a reference for a chromatic/achromatic color judgment according to his desire, the purpose of use, or the like.

A method of changing a judgment reference for a monochrome/color judgment (hereinafter referred to as "ACS") which is made as to an original during a prescan operation will be explained below with reference to FIG. 38A.

A method is based on the assumption that a judgment reference may be adjusted or set during the process of manufacturing a product (or image processing apparatus according to the present invention) or that a service man may change the judgment reference. In such a method, the judgment reference can be changed by a special key operation of which general users are not informed.

In the key operation for changing the judgment reference, the asterisk key 616 shown in FIG. 37 is depressed with a standard image 1501 selected. Then, after a key marked "9" of the ten-key pad 601 has been depressed three times, the asterisk key 616 is depressed to select an altered state 1502.

In the altered state 1502, in making a judgment as to whether each pixel has a chromatic color or an achromatic color, a desired separation level can be selected from nine separation levels "1" to "9", depending on whether an achromatic color judgment or a chromatic color judgement should be preferentially performed at a chromatic/achromatic separation level.

The number of separation levels are not limited to nine and may be increased or decreased as required. More specifically, if the separation level is "1", the highest preference is given to an achromatic color judgment and an area which is regarded as an chromatic area is at its maximum. If the separation level is "9", the highest preference is given to a chromatic color judgment and an area which is regarded as an achromatic area is at its minimum. At the separation levels "2" to "8", the interval between the levels "1" and "9" is appropriately divided so that an area which is regarded as an achromatic area is made gradually narrower.

As the altered state 1502 is selected, settings can be changed by operating the ◁ key 615 and the ▷ key 616. For example, if the ▷ key 616 is depressed with the separation level being "5" as shown on a display 1503, the separation level is incremented to "6" and the display 1504 is provided.

In contrast, if the ◁ key 615 is depressed, the separation level is decremented by one so that the display 1504 (the separation level=6) is changed into the display 1503 (the separation level=5).

Figure 38B:
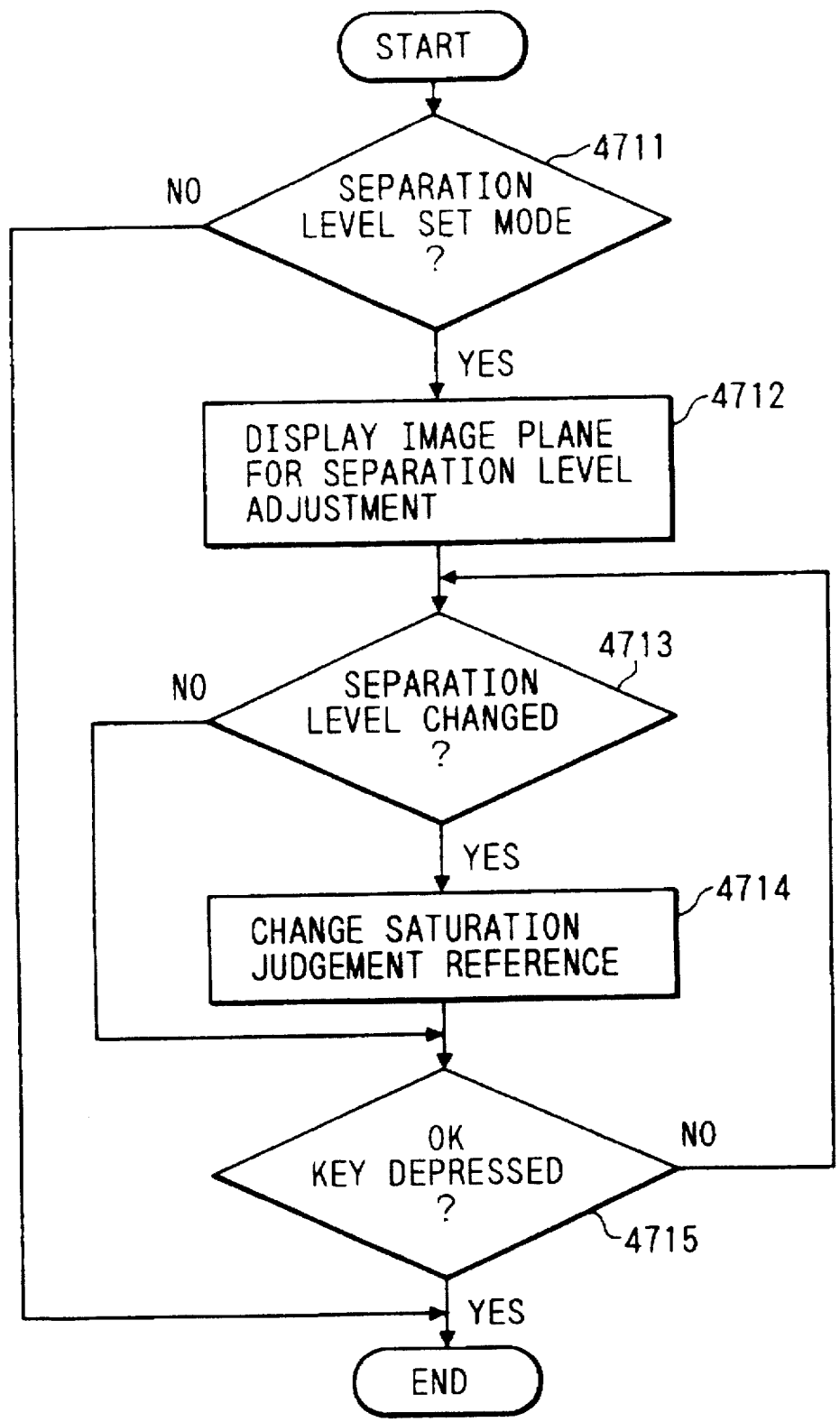

The aforesaid procedure will be explained below with reference to the flow chart of FIG. 38B which is associated with the CPU 118 and the block diagram of FIG. 38C.

In Step 4711, the asterisk key is depressed and predetermined setting is performed, and it is judged whether or not a separation level set mode has been activated. If it is judged that the separation level set mode has been activated, the process proceeds to Step 4712, where a display image plane for adjustment of an ACS chromatic/achromatic colors separation level is displayed on the display panel 602 shown in FIG. 38C.

In Step 4713, the ACS chromatic/achromatic colors separation level is changed through the control-key pad 611. If a change command is inputted, the process proceeds to Step 4714, where the saturation judgment reference in the color judgment unit 109 of FIG. 38C is changed as will be explained below.

If the level setting is completed, the process proceeds to Step 4715, where the OK key 612 is depressed to complete the flow.

FIG. 39 shows a specific example of a change in judgment conditions as to the chromatic/achromatic colors separation levels "1" to "9".

The values of iAR, iAG, . . . , iCB, WMN and WMX in FIG. 4 for the respective separation levels are set in the color judgment unit 109 with respect to the respective separation levels "1" to "9" by the CPU 118 in Step 902 of FIG. 10, as shown in FIG. 39. Thus, it is possible to adjust judgment conditions.

Figure 38C:
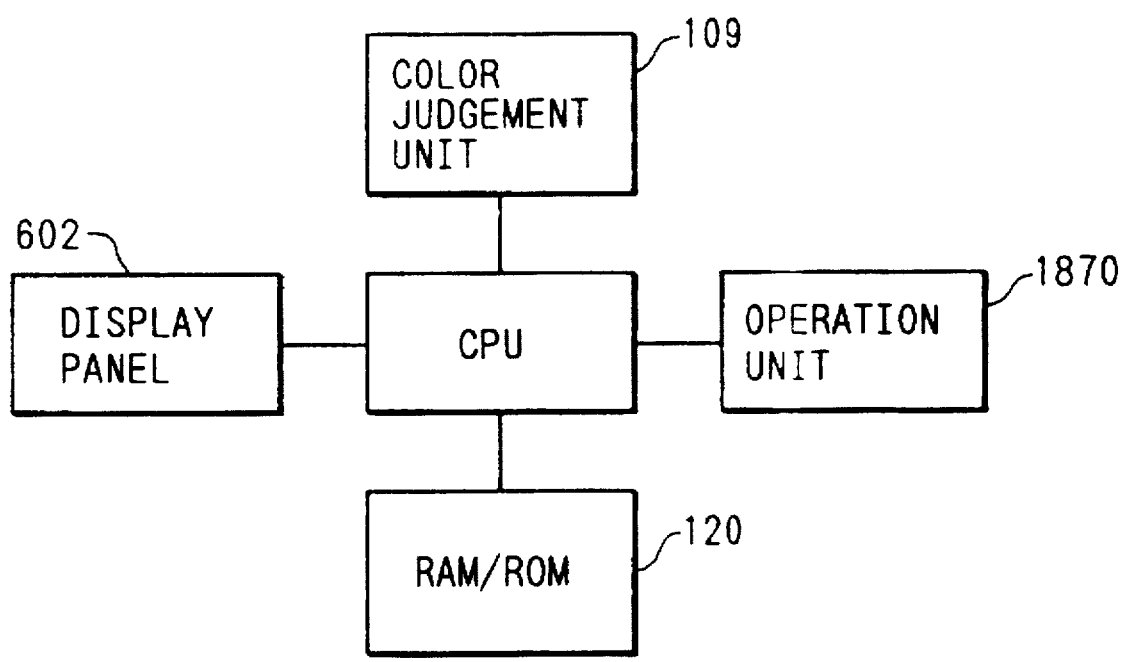

The separation level data shown in FIG. 39 are stored in the ROM/RAM 120 (refer to FIG. 38C). The separation level data representing each of the levels "1" to "9" may be stored in a ROM, and the values of iAR, . . . , WMX may be generated by supplying addresses 1 to 9, respectively.

[Change in Saturation Judgment Reference in Main Scan]

In the above-described arrangement, a reference for a judgment as to whether an original is a color original or a monochrome original is changed during the original judgment scan (ACS). Even in the main scan, it is likewise possible to adjust the chromatic/achromatic colors separation levels. More specifically, although the first embodiment has the function of producing a copy of a black character portion in black only, it is possible to change a judgment reference for a judgment as to the black character portion.

Figure 40:
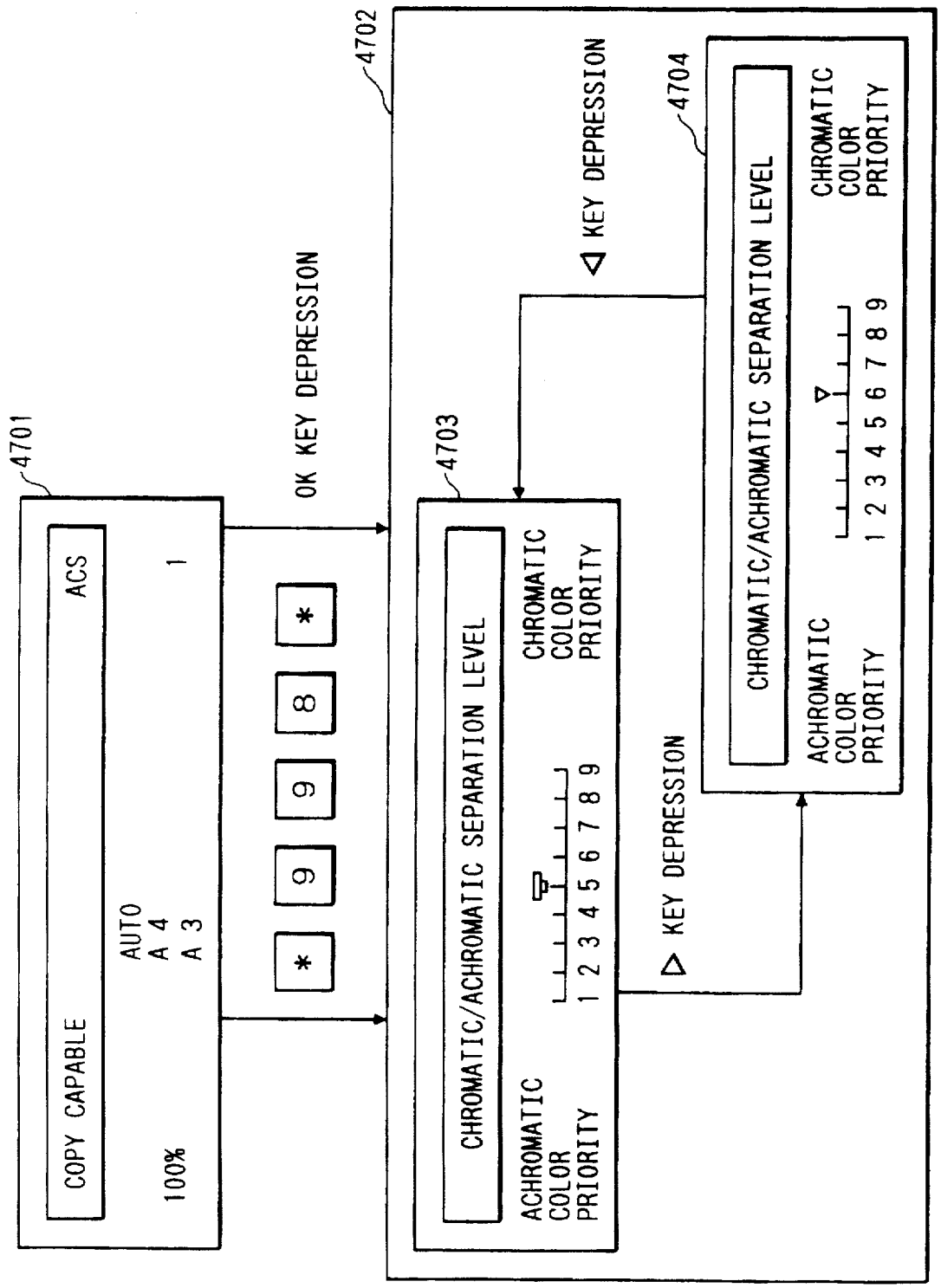
FIG. 40 is a view showing the state of a display panel setting of a chromatic/achromatic colors separation level for a black-character judgment.

A procedure for setting the chromatic/achromatic colors separation level for the main scan is substantially the same as the aforesaid procedure for ACS. FIG. 40 is a view similar to FIG. 38A, but shows a different change in the display image plane of a display panel shown in FIG. 40. Even in the main scan, the values KAR, KAG . . . , ICB each of which corresponds to the separation levels "1" to "9" may be set as judgment references in the color judgment unit 109 in Step 905 of the flow chart shown in FIG. 10. These separation levels are set independently of the separation levels shown in FIG. 39. As shown in FIG. 40, as the standard image plane 4701 is selected, the keys "*", "9", "9", "8" and "*" are depressed and the desired level can be selected from the levels "1" to "9" by operating the ▷ or ◁ key. In this case, parameters for the separation levels in the main scan and those for the separation levels in the prescan (ACS) may be prepared in common.

By adjusting the separation levels "1" to "9", it is possible to accurately adjust the difference between individual apparatus and to sufficiently reflect the desire or purpose of use of each operator.

As is apparent from the foregoing that, in accordance with the above-described embodiment, when a judgment is to be made as to whether a color image signal read from an original has a chromatic color or an achromatic color, the relevant judgment level can be changed through an operating unit, whereby it is possible to accurately adjust variations in characteristic between individual apparatus or to sufficiently reflect the desire or purpose of use of each operator.

Although parameters for a black pixel judgment are changed for each of the main scan and the prescan as described above, a judgment as to black pixels may be made in the prescan and the result may be stored in, for example, a bit-map memory as information for one image or several lines so that a black pixel processing is not performed in the main scan.

Parameters for changing a black pixel judgment may be changed for the main scan and the prescan by means of a CPU as described above. Different table ROMs which store different kinds of saturation judgment data may be prepared in advance and these tables may be selectively used for the main scan and the prescan.

As described above, in accordance with the present invention, it is possible to achieve a high degree of recognition, whereby image processing having an extremely high image reproducibility can be accomplished.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   input means for inputting image data representing an original image, the image data having a chromatic component;
   judging means for judging, based on the chromatic component of the image data, whether the original image is a monochrome image or a color image;
   processing means for processing the image data in accordance with a judgment result of said judging means; and
   mode setting means for setting one of a first mode in which said processing means processes the image data in accordance with the judgment result and a second mode in which said processing means processes the image data irrespective of the judgment result;
   wherein said judging means comprises saturation judging means for judging the chromatic component of the original image and an achromatic component of the original image.

2. An apparatus according to claim 1, wherein said input means comprises scanning means for scanning the original image and for generating the image data.

3. An apparatus according to claim 2, wherein said scanning means comprises a plurality of linear sensors arranged in parallel, each of the linear sensors generating a different color.

4. An apparatus according to claim 1, further comprising changing means for changing a judging standard of the saturation judging means.

5. An apparatus according to claim 1, further comprising image forming means for forming an image onto a recording medium in accordance with the image data processed by said processing means.

6. An apparatus according to claim 1, wherein the second mode includes a black and white mode and a full-color mode.

7. An apparatus according to claim 1, further comprising display means for displaying the mode set by said mode setting means.

8. An apparatus according to claim 1, wherein said judging means does not perform judgment in the second mode.

9. An apparatus according to claim 1, wherein the second mode includes a color process mode and a black process mode, and wherein the apparatus further comprises selecting means for manually selecting the color process mode or the black process mode in the second mode.

10. An apparatus according to claim 1, wherein said saturation judging means further judges an intermediate portion of the original image.

11. An image processing method comprising the steps of:
    inputting image data representing an original image, the image data having a chromatic component;
    judging, based on the chromatic component of the image data, whether the original image is a monochrome image or a color image;
    processing the image data in accordance with a judgment result from said step of judging; and
    setting one of a first mode in which the image data is processed in accordance with the judgment result and a second mode in which the image data is processed irrespective of the judgment result;
    wherein said judging step comprises a saturation judging step for judging the chromatic component of the original image and an achromatic component of the original image.

12. A method according to claim 11, wherein said inputting step is performed by using a scanning means for scanning the original image and for generating the image data.

13. A method according to claim 12, wherein the scanning means comprises a plurality of linear sensors arranged in parallel, each of the linear sensors generating a different color.

14. A method according to claim 11, wherein said judging step is not performed in the second mode.

15. A method according to claim 11, wherein the second mode includes a color process mode and a black process mode, and wherein the method further comprises a step of manually selecting the color process mode or the black process mode in the second mode.

16. A method according to claim 11, wherein said saturation judging step further judges an intermediate portion of the original image.

17. A method according to claim 11, further comprising a step of changing a judging standard in the saturation judging step.

18. A method according to claim 11, further comprising a step of forming an image onto a recording medium in accordance with the image data processed in said processing step.

19. A method according to claim 11, wherein the second mode includes a black-and-white mode and a full-color mode.

20. A method according to claim 11, further comprising a step of displaying the mode set in said setting step.

* * * * *

UNITED STATES PATENT AND TRADEMARK OFFICE
CERTIFICATE OF CORRECTION

PATENT NO. : 5,724,440

DATED : March 3, 1998

INVENTOR(S) : Masahiro Funada, et al.

It is certified that error appears in the above-indentified patent and that said Letters Patent is hereby corrected as shown below:

COLUMN 2

Line 3, "judging on frame" should read --judging whether--.
Line 4, "of whether" should read --one frame of--.

COLUMN 6

Line 45, "5-1" should read --5A--.
Line 46, "5-1," should read --5A,--.
Line 48, "5-1" should read --5A--.
Line 50, "5-2." should read --5B.--.

COLUMN 7

Line 5, "5-2" should read --5B--.
Line 10, "6-1," should read --6A,--.
Line 12, "6-2," should read --6B,--.
Line 23, "7-1." should read --7A.--.
Line 32, "7-1" should read --7A--.

UNITED STATES PATENT AND TRADEMARK OFFICE
CERTIFICATE OF CORRECTION

PATENT NO. : 5,724,440

DATED : March 3, 1998

INVENTOR(S) : Masahiro Funada, et al.

It is certified that error appears in the above-indentified patent and that said Letters Patent is hereby corrected as shown below:

<u>COLUMN 8</u>

Line 16, "7-2" should read --7B--.
Line 59, "7-1" should read --7A--.

<u>COLUMN 17</u>

Line 29, "7-1." should read --7A.--

<u>COLUMN 18</u>

Line 6, "7-1B," should read --7A,--.
Line 8, delete "are".

<u>COLUMN 19</u>

Line 4, "7-1" should read --7A--.

<u>COLUMN 21</u>

Line 16, "7-1" should read --7A--.

Signed and Sealed this

Eleventh Day of August 1998

Attest:

BRUCE LEHMAN

*Attesting Officer*  *Commissioner of Patents and Trademarks*